United States Patent [19]

Saitou et al.

[11] Patent Number: 5,197,006
[45] Date of Patent: Mar. 23, 1993

[54] AUTOMATIC TRANSMISSION SYSTEM WHICH MINIMIZES SHIFT-SHOCK USING DUTY CYCLE-CONTROLLED SOLENOID VALVES

[75] Inventors: Yoshitami Saitou, Nishikamo; Nobuyuki Isono, Nagoya; Nobuyasu Suzumura, Toyota, all of Japan; Makoto Inoue, Brussels, Belgium

[73] Assignee: Aisin Seiki Kabushiki Kaisha, Kariya, Japan

[21] Appl. No.: 790,007

[22] Filed: Nov. 4, 1991

Related U.S. Application Data

[63] Continuation of Ser. No. 442,644, Nov. 29, 1989, abandoned.

[30] Foreign Application Priority Data

Nov. 30, 1988 [JP] Japan .................. 63-303393
Nov. 30, 1988 [JP] Japan .................. 63-303395

[51] Int. Cl.5 .............. F16H 59/42; F16H 61/06; F16H 61/08
[52] U.S. Cl. ................. 364/424.1; 74/866; 74/869; 192/0.032; 192/0.076
[58] Field of Search ............. 364/424.1; 74/866, 867, 74/869; 192/0.03, 0.032, 0.076, 0.077

[56] References Cited

U.S. PATENT DOCUMENTS

| | | |
|---|---|---|
| 4,730,519 | 3/1988 | Nakamura et al. ............. 364/424.1 |
| 4,831,900 | 5/1989 | Yamamoto et al. ............. 74/869 |
| 4,855,913 | 8/1989 | Brekkestran et al. ........... 364/424.1 |
| 4,882,952 | 11/1989 | Kashihara et al. ............. 74/867 |
| 4,893,527 | 1/1990 | Furusawa et al. ............. 74/866 |
| 4,896,569 | 1/1990 | Ito et al. ...................... 74/866 |
| 4,942,530 | 7/1990 | Boda et al. .................. 364/424.1 |

FOREIGN PATENT DOCUMENTS 63-214550 9/1988 Japan .

Primary Examiner—Parshotam S. Lall
Assistant Examiner—E. J. Pipala
Attorney, Agent, or Firm—Burns, Doane, Swecker & Mathis

[57] ABSTRACT

An electronically controlled automatic transmission system for applying and releasing clutches and brakes when the gears for the speed ranges are to be shifted or changed in accordance with the drive torque of the engine. Each brake and clutch is controlled by a solenoid valve and a manual valve. The manual valves control the application of fluid pressure to the clutches and the brakes. Each manual valve has a separate solenoid valve which controls the manual valve in accordance with the detected value of the driving force of the engine. In addition, the automatic transmission system measures the number of revolutions of the input shaft to the automatic transmission after the clutches and brakes at the release side are released for a gear shift, and detects the acceleration of the number of revolutions of the input shaft of the automatic transmission.

13 Claims, 16 Drawing Sheets

AUTOMATIC TRANSMISSION SYSTEM WHICH MINIMIZES SHIFT-SHOCK USING DUTY CYCLE-CONTROLLED SOLENOID VALVES

This application is a continuation of Application Ser. No. 07/442,644 filed Nov. 29, 1989 now abandoned.

BACKGROUND OF THE INVENTION

1. Field of the Invention

The present invention relates to an electronically controlled automatic transmission system to be mounted on a vehicle and, more particularly, to an electronically controlled automatic transmission system for applying and releasing their clutches and/or brakes, when the gears for the speed ranges are to be shifted or changed, in accordance with the drive torque of the engine. The present invention further relates to an automatic transmission system of the aforementioned type for bringing the clutches and/or brakes gradually into engagements when the gears are to be shifted.

2. Description of the Prior Art

In a vehicular automatic transmission system disclosed in the prior art, the gears are shifted for the target speed range by once releasing the clutches and/or brakes being applied to engage and then by applying the clutches and/or brakes selectively for the speed range. The engagement and releases of the clutches and/or brakes are accomplished by switching the flows of a working liquid at the solenoid valves by fluid pressure switching means such as oil pressure lines. The solenoid valves are controlled by a microcomputer or the like.

In an electronic timing control, the engine revolutions abruptly rise, if the released clutches and/or brakes are released while the engine drive torque is high. This makes it necessary to adjust the timings for starting the engagements of the clutches and/or brakes. Therefor, the engine drive torque is detected to change the adjustment in accordance with the drive torque detected.

In the system disclosed in the prior art, however, the engine revolutions may abruptly rise if the drive torque detector is troubled or has its output value offset due to aging.

In the vehicular automatic transmission system of the prior art, according to another aspect of the present invention, there is known a technology by which the clutches and/or brakes of the automatic transmission are to be brought not abruptly but gradually into engagements. These gradual engagements are effected by changing the engaging ratio gradually to prevent the abrupt engagements and to reduce the shocks.

In the meanwhile, the clutches and/or brakes at the engagement side may be engaged due to the delay in the oil pressure before the clutches and/or brakes at the release side are completely released. In this dual engagement state, the drive torque will drop, but the completely neutral state is not invited to raise an advantage that few shocks are caused at the engagements of the clutches and/brakes.

However, this dual engagement state cannot be detected very well by the detectors disclosed in the prior art. As a result, the state bypasses the dual engagement to the completely neutral state, or the dual engagements are so high that the drive torque is dropped which causes intense shocks. This makes it impossible to achieve the control using the dual engagements.

SUMMARY OF THE INVENTION

It is, therefore, a major object of the present invention to provide an electronically controlled automatic transmission system prevented from any abrupt rise in the engine revolutions when the neutral state is established in the engagement state.

Another major object of the present invention is to provide an electronically controlled automatic transmission system which is protected from the abrupt revolution rise which might otherwise be caused by the erroneous detection of the drive torque.

According to the present invention, there is provided an electronically controlled automatic transmission system comprising: an automatic transmission including clutches and brakes adapted to be actuated by applying a fluid pressure, for changing gear ratios in accordance with the engagements and releases of the clutches and the brakes; fluid pressure switching means for controlling the application of the fluid pressure to the clutches and the brakes; drive power detecting means for detecting the drive force of an engine; and electronic control means for driving the fluid pressure switching means in accordance with the detected value of the drive force detecting means to change the engagements and releases of the clutches and the brakes, wherein the improvement comprises: revolution number measuring means for measuring the number of revolutions of the input shaft of the automatic transmission after the clutches or the brakes at the release side are released for the gear shift; and acceleration detecting means for detecting the acceleration of the number of revolutions detected by the revolution number measuring means, and wherein the electronic control means causes the clutches or the brakes at the release side to engage at a predetermined ratio, if the acceleration detected by the acceleration detecting means after the release of the clutches or the brakes at the release side and before the engagement of the clutches or the brakes at the engagement side is high when the detected value of the drive force detecting means is small.

Moreover, the electronic control means elongates the time period from the decision of a next gear shift to the instruction of releasing the clutches or the brakes at the release side, if the acceleration detected by the acceleration detecting means after the release of the clutches or the brakes at the release side and before the engagement of the clutches or the brakes at the engagement side is high when the detected value of the drive force detecting means is small.

Still moreover, the electronic control means shortens the time period from the release of the clutches or the brakes at the release side to the engagements of the clutches or the brakes at the engagement side, if the acceleration detected by the acceleration detecting means after the release of the clutches or the brakes at the release side and before the engagement of the clutches or the brakes at the engagement side is high when the detected value of the drive force detecting means is small.

According to the aforementioned technical means, the electronic control means instructs the fluid pressure switching means, when in the gear shift, to release the clutches or brakes at the release side and engage the clutches or brakes at the engagement side in accordance with the engine drive torque detected by the drive force detecting means. Now, when the output value of the drive force detecting means is small, the following operations occur if the number of revolutions of the input shaft of the automatic transmission abruptly rises: (1) The clutches or brakes at the release side are engaged again; (2) The time period from the judgment of the subsequent gear shift to the release of the clutches or brakes at the release side is elongated; (3) The time period from the releases of the clutches or brakes at the release side to the engagements of the clutches or brakes at the engagement side is shortened. As a result, despite the fact that the output value of the drive force detecting means is low, the time period of raising the number of revolutions of the engine can be shortened to lighten the shocks during the gear shift, even if the engine has such a high drive force that its number of revolutions is raised when the clutches or brakes at the release side are released.

According to another major aspect of the present invention, there is provided an electronically controlled automatic transmission system wherein the improvement comprises: revolution number measuring means for measuring the number of revolutions of the input shaft of the automatic transmission after the clutches or the brakes at the release side are released for the gear shift; acceleration detecting means for detecting the acceleration of the number of revolutions detected by the revolution number measuring means; and a peak value detecting means for monitoring the transition of the number of revolutions detected by the revolution number measuring means from the rise to the drop, and wherein the electronic control means instructs the fluid pressure switching means to engage the clutches or the brakes at the engagement side at a predetermined ratio in accordance with the detected value of the acceleration detecting means, after the release of the clutches or the brakes at the release side and to engage the clutches or the brakes at the engagement side at the ratio of the engagement start, when the peak value detecting means detects the transition of the number of revolutions of the input shaft of the automatic transmission from the rise to the drop, and then to increase the engagement ratio gradually.

According to the aforementioned technical means, if the electronic control means instructs the fluid pressure switching means to release the clutches or brakes at the release side, the actual releases of the clutches or brakes are retarded by the delay in the fluid pressure. As a result, the engine revolution number is gradually raised. If the clutches or brakes at the release side are released, the automatic transmission has its input and output sides disconnected. As a result, the number of revolutions at the input side of the automatic transmission is abruptly increased when the drive force of the engine is high. The acceleration detecting means detects the acceleration of this input shaft. In accordance with this acceleration, the electronic control means causes the clutches or brakes at the engagement side to engage at a predetermined ratio. Thus, the clutches or brakes at the engagement side are actuated to establish the partial or whole clutch state between the input and output sides of the automatic transmission thereby to suppress the rise in the number of revolutions of the engine. At the transition of the engine revolution number from the increasing to decreasing tendencies, the engaging ratio of the clutches or brakes at the engagement side is at the value of the engagement start and is gradually increased. This ensures the smooth engagements in the automatic transmission between the clutches or brakes at the engagement side because there occurs no abrupt increase in the engine revolution number after the releases of the clutches or brakes at the release side before the start of the engagements of the clutches or brakes at the engagement side.

BRIEF DESCRIPTION OF THE DRAWINGS

The aforementioned and other objects, features and advantages of the present invention will become apparent from the following description taken with reference to the accompanying drawings, in which.

DESCRIPTION OF THE PREFERRED EMBODIMENTS

The present invention will be described in the following in connection with its one embodiment with reference to the accompanying drawings. In the present embodiment, the automatic transmission body to be used may be one having four forward speeds (with the overdrive) as disclosed in the prior art.

Figure 1:
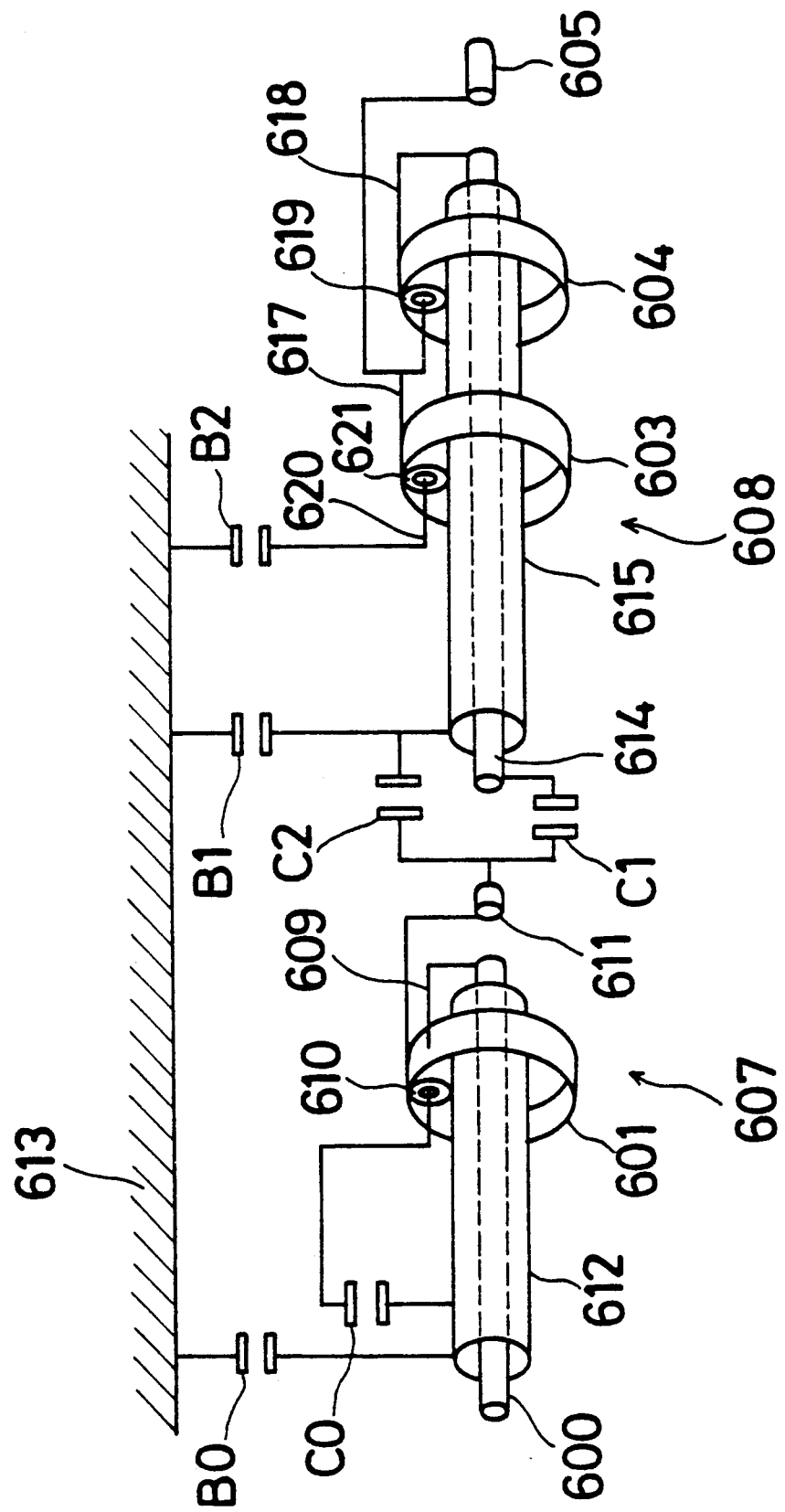
FIG. 1 is a diagram showing an automatic transmission of an electronically controlled automatic transmission system according to one embodiment of the present invention.

With reference to FIG. 1, the operations of this automatic transmission will be described in the following. A turbine shaft 600 acting as the input shaft of an overdrive mechanism 607 is coupled to the engine through a torque converter. The turbine shaft 600 is connected to the carrier 609 of a planetary gear mechanism. A planetary pinion 610 is rotatably borne by the carrier 609 and is connected through an OD planetary gear 601 to the input shaft 611 of a reduction gear mechanism 608. The planetary pinion 610 is in meshing engagement with a sun gear 612. An OD clutch CO is interposed between the sun gear 612 and the carrier 609. An OD brake BO is interposed between the sun gear 612 and a housing 613. A forward clutch C1 is interposed between the input shaft 611 and an intermediate shaft 614 of the reduction gear mechanism 608. A direct clutch C2 is also interposed between the input shaft 611 and a sun gear shaft 615. A second brake B1 is interposed between the sun gear shaft 615 and the housing 613. A planetary pinion 619 is rotatably borne by a carrier 617 connected to an output shaft 605 and is connected through a gear 604 and a carrier 618 to the intermediate shaft 614. The planetary pinion 619 is in a meshing engagement with the sun gear 615. A planetary pinion 612 meshes with both the carrier 617 and the sun gear 615. A 1st and Rev brake B2 is interposed between the planetary pinion 621 and the housing 613.

In the automatic transmission thus constructed, the relations prevailing among the clutches C0, C1 and C2 and the brakes B0, B1 and B2 are enumerated in the following Table 1:

TABLE 1

| | States of Clutches & Brakes | | | | | |
|---|---|---|---|---|---|---|
| | C0 | C1 | C2 | B0 | B1 | B2 |
| R | O | X | O | X | X | X |
| P, N | O | X | X | X | X | X |
| O/D | X | O | O | O | X | X |
| 3rd | O | O | O | X | X | X |
| 2nd | O | O | X | X | O | X |
| 1st | O | O | X | X | X | O | wherin:
O: in engagement; and
X: out of engagement.

Figure 2:
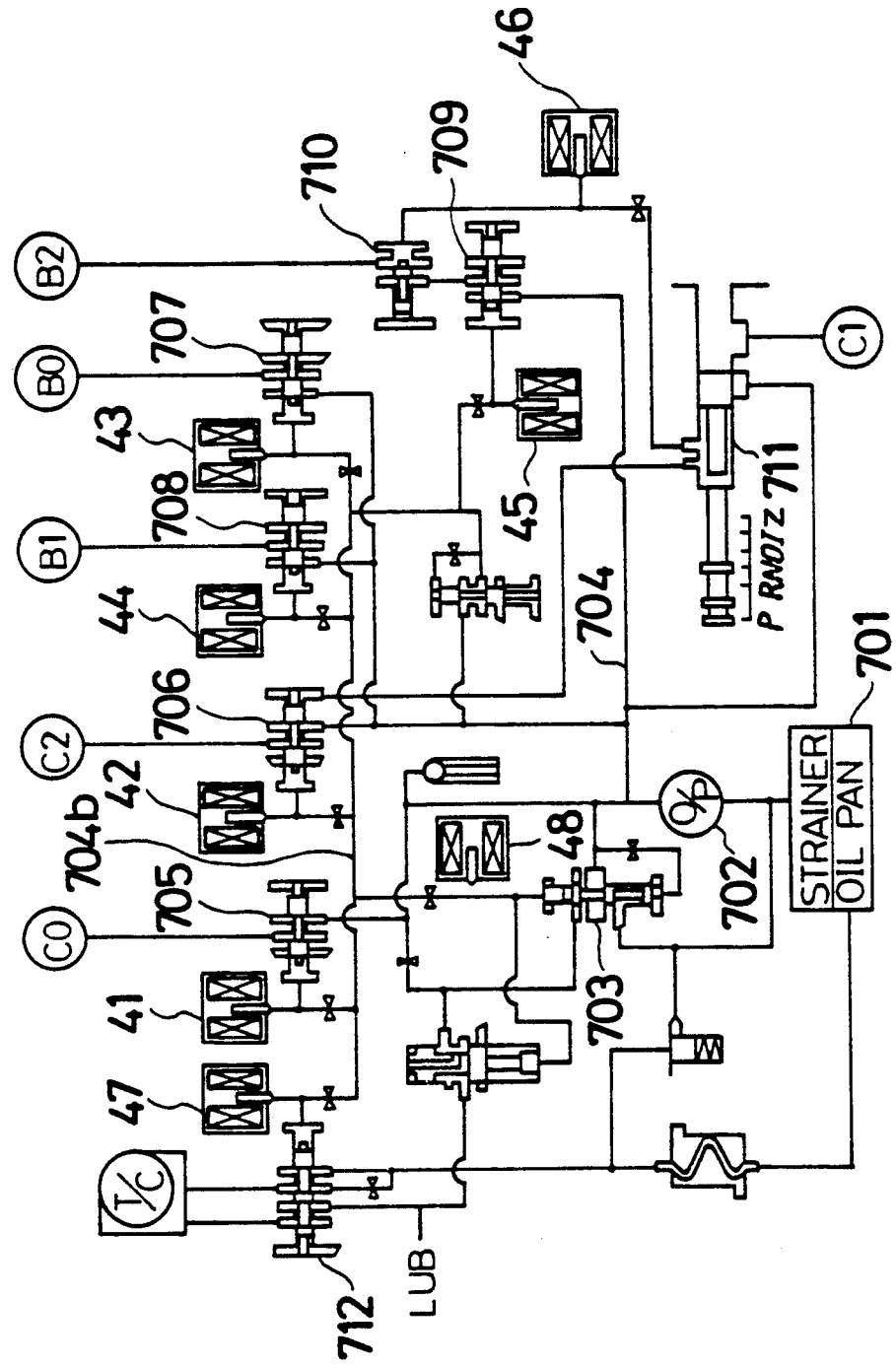
FIG. 2 is a diagram showing an oil pressure circuit for driving the automatic transmission of FIG. 1.

The engagements and releases of these clutches C0, C1 and C2 and the brakes B0, B1 and B2 are controlled by an oil circuit acting as the change-over means for the working fluid, as shown in FIG. 2.

With reference to FIG. 2, the working fluid or oil pumped up from an oil sump 701 by an oil pump 702 is fed to a pressure line 704. A pressure regulator valve 703 is controlled by a line pressure control solenoid valve 48 to regulate the oil pressure in the pressure line 704. The pressure line 704 is connected through the pressure regulator valve 703 with a pressure line 704b, which in turn is connected with manual valves 705, 706, 707, 708 and 709, respectively, through a solenoid valve 41 for controlling the clutch C0, a solenoid valve 43 for controlling the clutch C2, a solenoid valve 43 for controlling the brake B0, a solenoid valve for controlling the brake B1 and a solenoid valve 45 for controlling the brake B2. On the other hand, those manual valves 705, 706, 707, 708 and 709 are connected directly to the output of the oil pump 702. These manual valves 705, 706, 707 and 708 have their outputs connected to the clutch C0, the clutch C2, the brake B0 and the brake B1, respectively. The output of the manual valve 709 is connected to the brake B2 through a valve 710. The valve 710 in turn is connected through a low & reverse inhibiting solenoid valve 46 to a shift valve 711. The shift valve 711 in turn is connected to the manual valve 706. Thus, the shift valve 711 is moved in response to the manipulations of the shift lever so that the inside of shift valve 711 is exposed to the oil pressure from the oil pressure 702 when in the ranges other than the P range. On the other hand, the oil pressure is applied to the clutch C1 when in the 1st, 2nd, 3rd and OD ranges. Moreover, the oil pressure sure is supplied to the manual valve 706 in the L and 2nd ranges and to the low & reverse inhibiting solenoid valve 46 in the L and R ranges.

With this structure, the operations of the individual circuit elements will be described in the following.

Clutch C0: The valve member of the manual valve 705 is moved, when the clutch C0 controlling solenoid valve 41 is opened, so that the output of the oil pump 702 is fed to apply the clutch C0. When the clutch C0 controlling solenoid valve 41 is closed, the clutch C0 is fed with no oil pressure so that it is released.

Clutch C1: The clutch C1 is fed and applied with the oil pressure when in the 1st, 2nd, 3rd and OD ranges but is released in the other ranges.

Clutch C2: If the clutch C2 controlling solenoid valve 42 is opened, the valve member of the manual valve 706 is moved to apply the oil pressure to bring the clutch C2 into engagement. If the clutch C2 controlling solenoid valve 42 is closed, the clutch C2 receives no oil pressure so that it is released. When the L and 2nd ranges are caused by the shift valve 711, the oil pressure is fed to the manual valve 706 so that the oil pressure to the clutch C2 is cut irrespective of the motions of the clutch C2 controlling solenoid valve 42.

Brake 0: If the brake B0 controlling solenoid valve 43 is opened, the valve member of the manual valve 707 is moved to apply no oil pressure so that the brake B0 is released. If the brake B0 controlling solenoid valve 43 is closed, the oil pressure is applied to the brake B0 so that the brake B0 comes into engagement.

Brake 1: If the brake B1 controlling solenoid valve 44 is opened, the valve member of the manual valve 708 is moved so that no oil pressure is applied to the brake B1 to release the brake B1. If the brake B1 controlling solenoid valve 44 is closed, the brake B1 is applied with the oil pressure.

Brake 2: If the brake B2 controlling solenoid valve 45 is opened, the valve member of the manual valve 709 is moved to apply no oil pressure to the brake B2. If the brake B2 controlling solenoid valve 45 is closed, the oil pressure is applied through the valve 710 to the brake B2 so that the brake B2 comes into engagement. If, however, the low and reverse inhibiting solenoid valve 46 is turned on when in the R and L ranges, the oil pressure is applied to the valve 710 but not to the brake B2 to release the brake B2.

In the remaining structure, reference numeral 712 designates a lockup control valve. If a lockup controlling solenoid valve 47 is turned on, the output shaft of the engine and the turbine 600 are directly connected to establish the lockup state.

These solenoid valves are driven by a later-described electronic control circuit so that the individual clutch brakes are so controlled in accordance with the running conditions as to conform to the relations of the Table 1. Moreover, the individual solenoid valves are repeatedly turned ON and OFF at a relatively high frequency by the later-described electronic control circuit so that their degrees of openings can be adjusted by controlling their duty ratios. If the duty ratio is raised, the manual valve is widely opened so that the oil pressure generated by the oil pump 702 is promptly applied to accelerate the operation speeds of the individual clutches and brakes. If the dury ratio is decreased, on the contrary, the manual valve is narrowly opened so that the oil pressure of the oil pump 702 takes a long time to reach the individual clutches and brakes to decelerate the operation speeds of the individual clutches and brakes. Thus, the operation speeds of the individual clutches and brakes can be adjusted by controlling the duty ratio to reduce the shocks at the instants of engagements of the clutches and brakes and to improve the transmission efficiencies.

Figure 3:
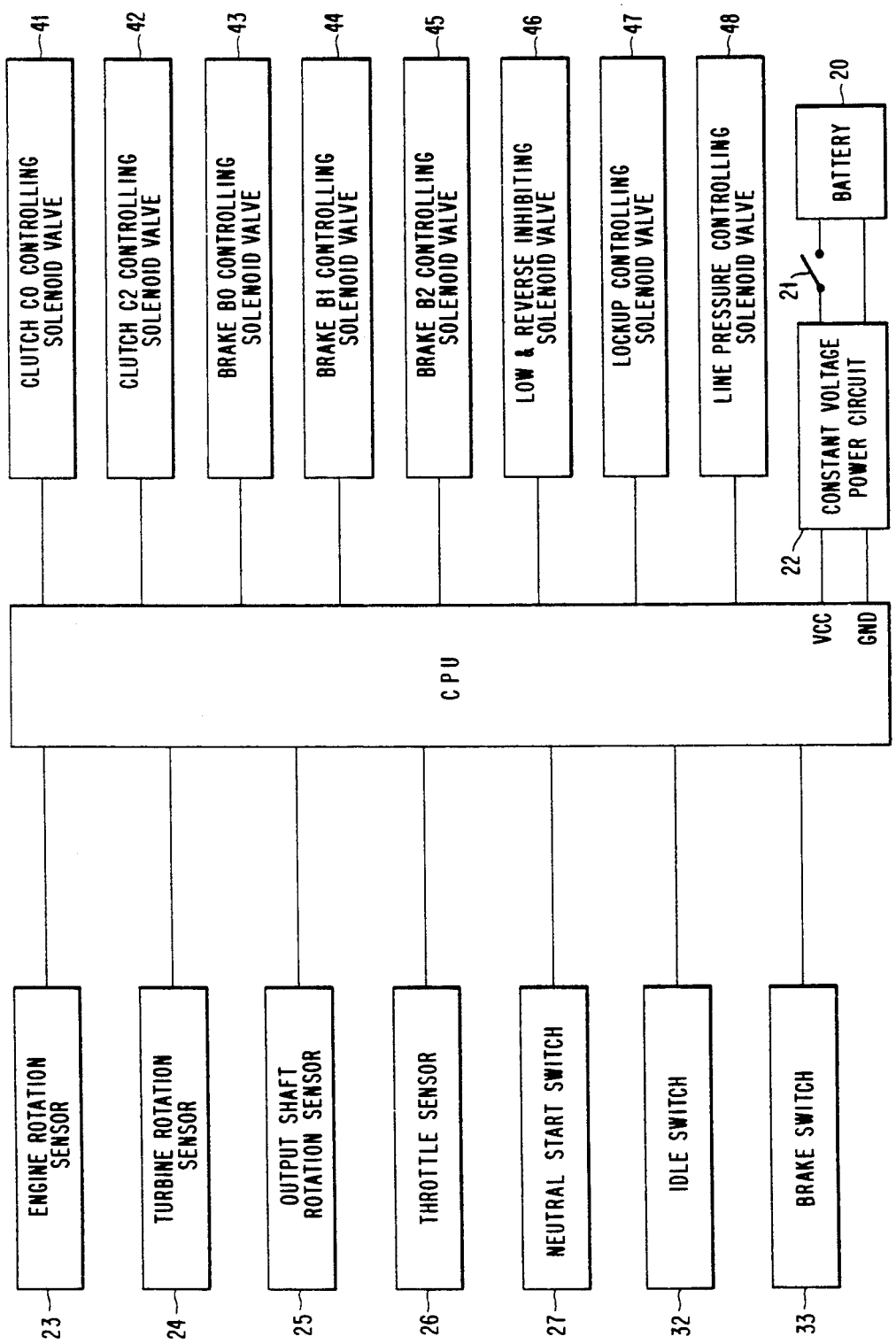
FIG. 3 is a block diagram showing an electronic control circuit for controlling the oil pressure circuit of FIG. 2.

FIG. 3 shows the electronic control circuit for driving the individual solenoid valve in the oil pressure circuit.

With the terminal of a battery 20 mounted on a vehicle, there is connected through an ignition switch 21 the input terminal of a constant voltage power circuit 22.

This constant voltage power circuit 22 has its output terminal connected with the power terminals VCC and GND of a central processing unit CPU. The constant voltage power circuit 22 is provided to convert the output voltage of the battery 20 to a voltage which can be used by the central processing unit CPU.

The individual input terminals of the central processing unit CPU are connected to an engine rotation sensor 23, a turbine rotation sensor 24, an output shaft rotation sensor 25, a throttle sensor 26, a neutral start switch 27, an idle switch 32 and a brake switch 33. For simplicity, FIG. 3 omits the input interfaces for the individual sensors and switches.

The engine rotation sensor 23 is a sensor for detecting the number of revolutions of the engine of a vehicle. This engine rotation sensor is arranged in the vicinity of the output shaft of the engine to output a pulse signal having a frequency according to the number of revolutions of the engine. In the present embodiment, the engine rotation sensor is a rotation sensor of an electromagnetic pickup type, which is arranged to face the teeth of a ring gear fixed on the engine output shaft, to output 120 pulses for one rotation of the ring gear. This output is sent to the central processing unit CPU.

The turbine rotation sensor 24 is a sensor for detecting the number of revolutions of the turbine. The turbine rotation sensor is arranged in the vicinity of the turbine rotation shaft to output a pulse signal having a frequency according to the number of revolutions of the turbine. In the present embodiment, the turbine rotation sensor is a rotation sensor of an electromagnetic pickup type, which is arranged to face the teeth of a gear fixed on the turbine shaft 600, to output 57 pulses for one gear rotation. This output is sent to the central processing unit CPU.

The output shaft rotation sensor 25 is a sensor for detecting the number of revolutions of the output shaft of the automatic transmission. The output shaft rotation sensor is arranged in the vicinity of the output shaft of the automatic transmission to output a pulse signal having a frequency according to the number of revolutions of the output shaft of the automatic transmission. In the present embodiment, the output shaft rotation sensor is a rotation sensor of an electromagnetic pickup type, which is arranged to face the teeth of a gear fixed on the output shaft, to output 18 pulses for one gear rotation. This output is sent to the central processing unit CPU. Incidentially, the output shaft rotation sensor may be replaced by another kind of speed sensor for detecting the speed of the vehicle if the relation between the numbers of revolutions of the output shaft of the automatic transmission and the vehicular wheels is clearly known.

The throttle sensor 26 is a sensor for detecting the degree of opening of the throttle valve of the engine. The throttle sensor is of the digital and mechanical type, in which the angle of rotation of the throttle valve is detected by a switch to divide the opening of the throttle valve, or of the analog and electric type, in which the angle of rotation of the throttle valve is converted into a voltage value to divide the opening of the throttle valve by means of an A/D converter. In the present invention, there are provided two throttle sensors which are switched for use but one of which may be used in the ordinary system. The throttle sensor outputs signals indicating one sixteenth of the opening of the throttle valve from four signal lines. The fully closed state is indicated at $\theta 0$, and the fully open state is indicated at $\theta 15$. The opening between $\theta 0$ and $\theta 15$ is divided into $\theta 1$ to $\theta 14$.

The neutral start switch 27 detects the positions of the shift lever and is composed of a D (drive) range switch, an L (low) range switch, a 2nd (second) range switch, a 3rd (third) range switch, an N (neutral) range switch, an R (reverse) range switch, and a P (parking) range switch to detect the individual D, L, 2nd, 3rd, N, R and P ranges.

The idle switch 32 is a sensor for detecting the idle state of the engine and has its contacts turned on when the engine is idle (for a throttle opening of 1.5% or less in the present embodiment).

The brake switch 33 detects the ON and OFF of the brake.

The individual output terminals of the central processing unit CPU are connected to the clutch CO controlling solenoid valve 41, the clutch C2 controlling solenoid valve 42, the brake BO controlling solenoid valve 43, the brake B1 controlling solenoid valve 44, the brake B2 controlling solenoid valve 45, the low and reverse inhibiting solenoid valve 46, the lockup controlling solenoid valve 47 and the line pressure controlling solenoid valve 48. For simplicity of illustrations, FIG. 3 omits the output interfaces or drive units of the individual solenoids. The above-specified solenoid valves are controlled by the central processing unit CPU.

Figure 4:
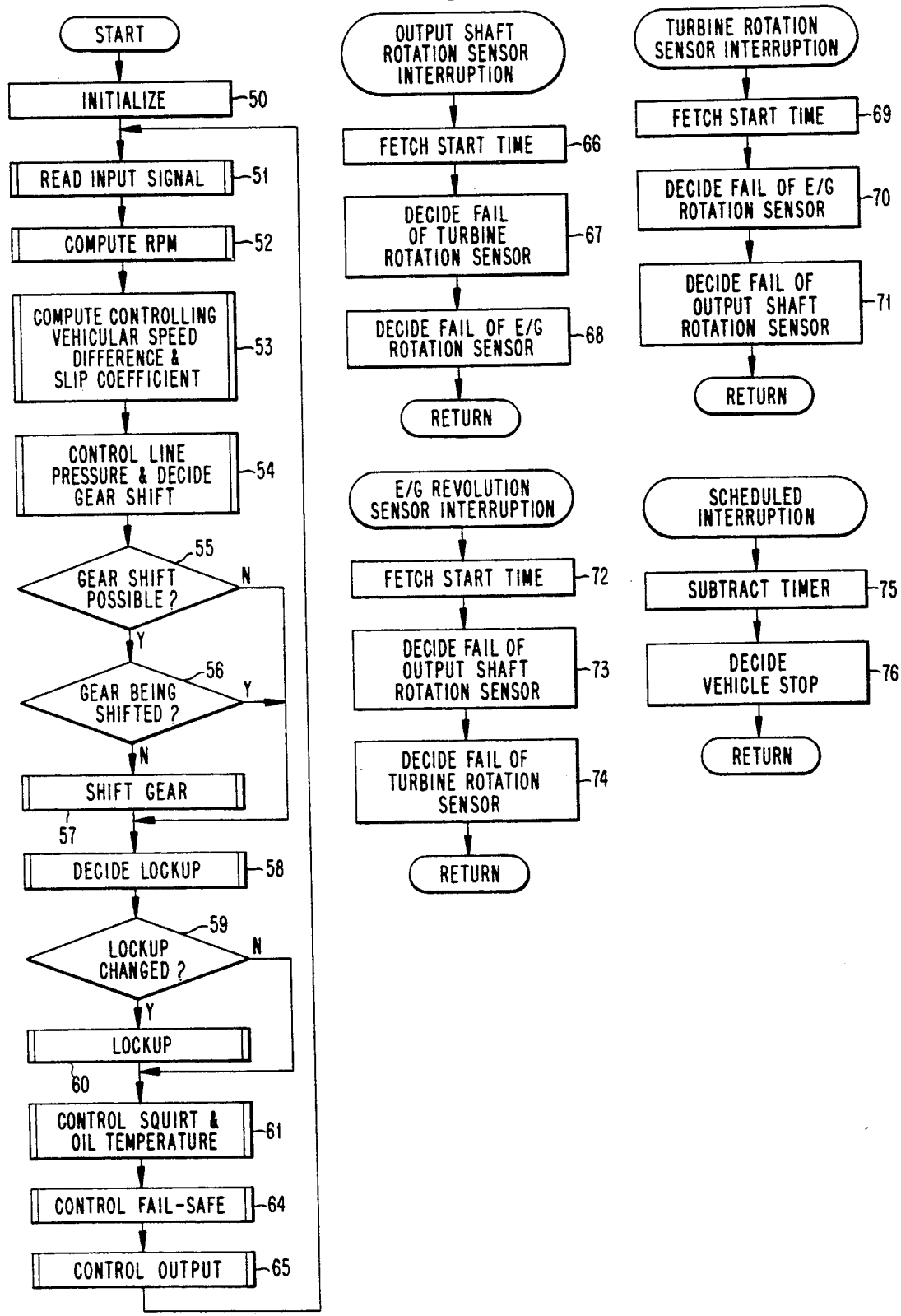
FIG. 4 is a flow chart showing the main routine of the CPU, the vehicular speed sensor interruptions, the turbine rotation sensor interruptions, the engine rotation sensor interruptions and the scheduled interruptions.

The central processing unit CPU is equipped with memories such as RAMs or ROMs, timers and registers and is started to execute the main routine of FIG. 4 when the ignition switch is turned on so that it is supplied with operating voltage.

FIG. 4 is a flow chart showing the main routine of the CPU, the vehicular speed sensor interruptions, the turbine rotation sensor interruptions, the engine rotation sensor interruptions and the scheduled interruptions.

Main Routine

When the central processing unit CPU is started, it is at first accomplished (at Step 50) to set the input/output directions of the individual input/output ports, to initialize the individual memories, and to set the presence of the interruptions.

It is then accomplished (at Step 51) to execute the input/output read routine in which the states of the individual sensors and switches connected with the inputs are read and cleared of noise to set the data according to the states of the sensors and switches.

Next, the revolution number computing routine is executed (at Step 52), in which the vehicular speed, the turbine revolution number and the engine revolution number are computed.

The engine revolution number NE is computed from the following equation, in which the output from the engine rotation sensor has a high frequency and is divided into one eighth for the computations:

$$NE = [nE(i-1) + nEi]/2;$$

and $$nEi = PCEi/TEi \times \tfrac{1}{1} \text{ frequency}/8 \times 10^{-6} \times 60/120,$$

wherein:
nEi: the engine revolution number by the present pulses;
TEi: the time count from the previous pulse to the edge of the first pulse exceeding 10 mS; and
PCEi: the pulse number in the TEi.

The turbine revolution number NT is computed from the following equation, in which the output of the turbine rotation sensor has such a high frequency that it is divided into one quarter:

$$NT = [nT(i-1) + nTi]/2;$$
and $$nTi = PCTi/TTi \times \tfrac{1}{4} \text{ frequency}/8 \times 10^{-6} \times 60/57,$$

wherein:
nTi: the turbine revolution number by the present pulses;
TTi: the time count from the previous pulse to the edge of the first pulse exceeding 10 mS; and
PCTi: the pulse number in the TTi.

The output shaft revolution number NO is computed from the following equation:

$$NO = [nO(i-1) + nOi]/2;$$
and $$nOi = PCOi/TOi \times \tfrac{1}{4} \times 10^{-6} \times 60.18,$$

wherein:
nOi: the output shaft revolution number by the present pulses;
TOi: the time count from the previous pulse to the edge of the first pulse exceeding 10 mS; and
PCOi: the pulse number in the TOi.

The computation of the first output shaft revolution number NO after the vehicle stop (which is judged in the later-described scheduled interruption routine) is carried out from the following equation:

$$NO = [144 + nOi]/2.$$

Since the gear ratio between the output shaft and the axle and the radius of the wheels are determined in advance, the vehicular speed can be determined from that output shaft revolution number NO.

The vehicular acceleration AG is determined from the following equation:
For $NOi \geq NO(i-1)$, $$AG = [NOi - NO(i-1)]/TOi \times \tfrac{1}{4} \times 10^{-6};$$

For the first time after the vehicle stop, $$AG = [NOi - 144)]/TOi \times \tfrac{1}{4} \times 10^{-6};$$ and For $NOi < NO(i-1)$, AG takes the maximum (YFF).

Next, the routine for computing the controlling vehicular speed difference and the slip coefficient is executed (at Step 53) to determine the controlling vehicular speed difference and so on.

According to another but major aspect of the present invention, the turbine slip coefficient SLPt is determined from the following equation:

$$SLPt = NT/NE \times 100(\%).$$

Next, the routine for controlling the line pressure control and the gear shift is executed (at Step 54) to set and control the line pressure, to set the control mode and to judge the gear shift. The line pressure value is set according to the throttle opening and the turbine revolution number. The line pressure solenoid is duty-driven according to those set values.

In the gear shift controls, the presence of the gear shift judgement is decided on the basis of the gear shift diagram which has been prepared in advance in accordance with the throttle opening, the vehicular speed and the present gear ratio.

When these procedures are ended, it is the judged in the line pressure and gear shift controlling routine that the gear shift can be accomplished. In the operations other than the gear shift, the gear shifting routine is executed to effect the gear shift.

Next, the lockup judging routine is executed. In the case of the lockup change, the lockup routine is executed to effect the lockup. Here, the engine braking control is accomplished as part of the lockup execution. The braking on the engine is effected by turning on the lockup solenoid to cause the direct connection while the engine revolution number is smaller than the turbine revolution number irrespective of the gear ratio when the throttle is fully closed (with the idle contact ON) and when the vehicle speed is at 15 Km/h or higher. The gear shift is judged by the gear ratio after lapse of 0.6 sec. of the state in which the idle contact is OFF or when the engine revolution number is larger than the turbine revolution number.

Next, the squat control routine is executed (at Step 61) to accomplish the squat control for shifting up the gear temporarily to 3rd to dampen the shocks when the speed range comes out of the neutral range when the vehicle stops.

Next, the fail-safe control is executed (at Step 64) to effect the fail-safe.

At last, the output control routine is executed (at Step 65) to control the output.

Interruption Routines

The outputs of the output shaft rotation sensor, the turbine rotation sensor and the engine rotation sensor are connected to the interruption input terminals of the central processing unit CPU, respectively, so that the output shaft rotation sensor interruption routine, the turbine rotation interruption routine and the engine rotation sensor interruption routine are executed each time the voltage levels of the interruption terminals are changed.

In the output shaft rotation sensor interruption routine, the interruption time is first read out from a timer, and the computation flag for the output shaft revolution number is displayed. Next, it is decided (at Steps 66 to 68) whether or not the turbine rotation sensor and the engine rotation sensor are having trouble. This trouble decision is accomplished by comparing the output shaft revolution number, and the turbine revolution number and the engine revolution number.

In the turbine rotation sensor interruption routine, the interruption time is first read out from the timer, and the computation flag for the turbine revolution number is displayed when the four interruptions are counted for the input pulse. Next, it is decided (at Steps 69 to 71) whether or not the engine rotation sensor and the output shaft rotation sensor are having trouble. This trouble decision is accomplished by comparing the tubine revolution number, and the engine revolution number and the output shaft revolution number.

In the engine rotation sensor interruption routine, the interruption time is first read out from the timer, and the computation flag for the engine revolution number is displayed when the eight interruptions are counted for dividing the input pulse into eight. Next, it is decided (at Steps 72 to 74) whether or not the output shaft rotation sensor and the turbine rotation sensor are having trouble. This trouble decision is accomplished by comparing the engine revolution number, and the output shaft revolution number and the turbine revolution number.

The central processing unit CPU is scheduled with the interruptions which are caused at every lapses of a constant time. In this embodiment, the scheduled interruption routine is executed every 4 ms. Here, the various timers to be used for the control are subjected to substractions (at Step 75). Next, it is decided (at Step 76) whether or not the vehicle is stopped. In this embodiment, the vehicle stop is decided for a vehicle stop speed of Nstop=144 rpm (about 3 Km) or less. The vehicle stop is also decided when there is no pulse for a time period longer than the input frequency to the central processing unit CPU of Tstop=23.13 ms or more.

The detail of the output control will be described in the following with reference to the flow charts.

Output Control Routine

Figure 5:
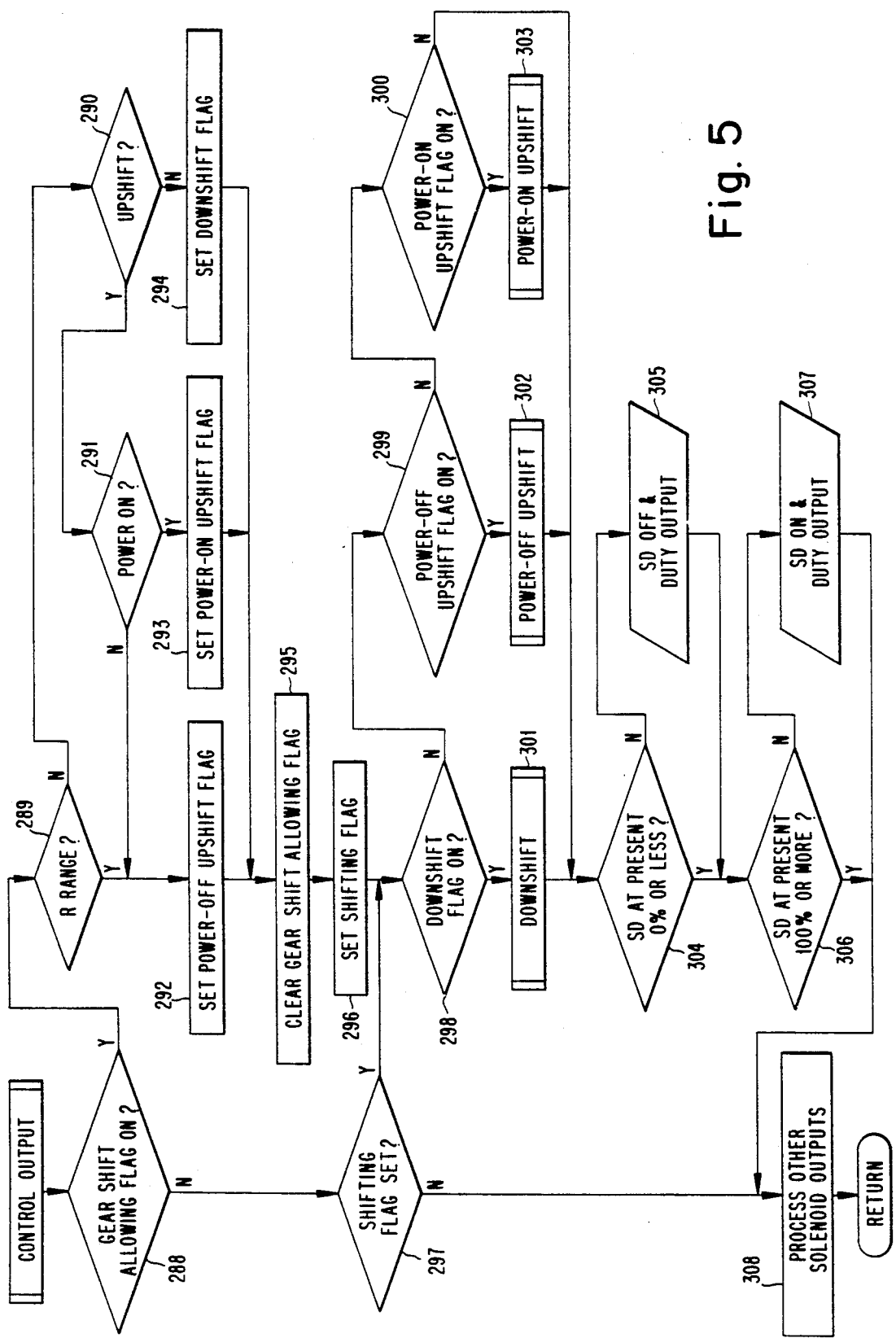
FIG. 5 is a flow chart showing the output control routine of the CPU of the electronic control circuit of FIG. 3.

FIG. 5 is a flow chart showing the output control routine.

If the shift allowance flag is ON in the R range, at the upshift and for the power-off ($\theta < \theta_2$ or with the idle switch ON), the power-off upshift flag is set (at Step 292), the shift allowance flag is cleared (at Step 295), and the shift flag is set (at Step 296). In the ranges other than the R range, at the upshift and with the power-on ($\theta \geq \theta_2$), the power-on upshift flag is set (at Step 293), the shift allowance flag is cleared (at Step 295), and the shift flag is set (at Step 296). In the ranges other than the R range and at the downshift, the shift allowance flag is cleared (at Step 294), the shift allowance flag is cleared (at Step 295), and the shift flag is set (at Step 296).

When the shift allowance flag or the shift flag is ON (at Step 297), the downshift routine is executed (at Step 301), if the downshift flag is ON (at Step 298), and the power-off upshift routine is executed (at Step 302), if the power-off upshift flag is ON (at Step 299), and the power-on upshift routine is executed (at Step 303) if the power-on upshift flag is ON (at Step 300). Unless the duty ratio SDOFF of the release side solenoid valves set in each shift routine is 0% or less (at Step 304), the release side solenoid valve is controlled at the duty ratio SDoff (at Step 305). Unless, on the other hand, the duty ratio SDON of the engagement side solenoid valves set in each shift routine is 100% or more (at Step 306), the engagement side solenoid valve is controlled at the duty ration SDon (at Step 307). The engagement side solenoid valves and the release side solenoid valves are set at the individual shifts. The solenoid valves for the individual shifts are enumerated in the following Table:

TABLE 2

| Shift | Release Side | Engagement Side |
|---|---|---|
| 1 → 2 | B2 | B1 |
| 1 → 3 | B2 | C2 |
| 1 → 4 | B2, C0 | B0, C2 |
| 1 → N | B2 | — |
| 1 → R | — | C2 |
| 2 → 3 | B1 | C2 |
| 2 → 4 | B1, C0 | B0, C2 |
| 2 → N | B1 | — |
| 2 → R | B1 | B2, C2 |
| 3 → 4 | C0 | B0 |
| 3 → N | C2, C0 | — |
| 3 → R | — | B2 |
| 4 → N | B0, C2 | C0 |
| 4 → R | B0, B2 | C0 |
| N → R | — | B2, C2 |

In the reverse shift, the solenoid valves at the engagement side and at the release side are reversed.

After this, if it is necessary to change the other solenoid valves, e.g., the lockup controlling solenoid valve, the output is generated to drive that solenoid valve, followed by returning to the main routine.

Power-on Upshift Routine

Figure 6A:
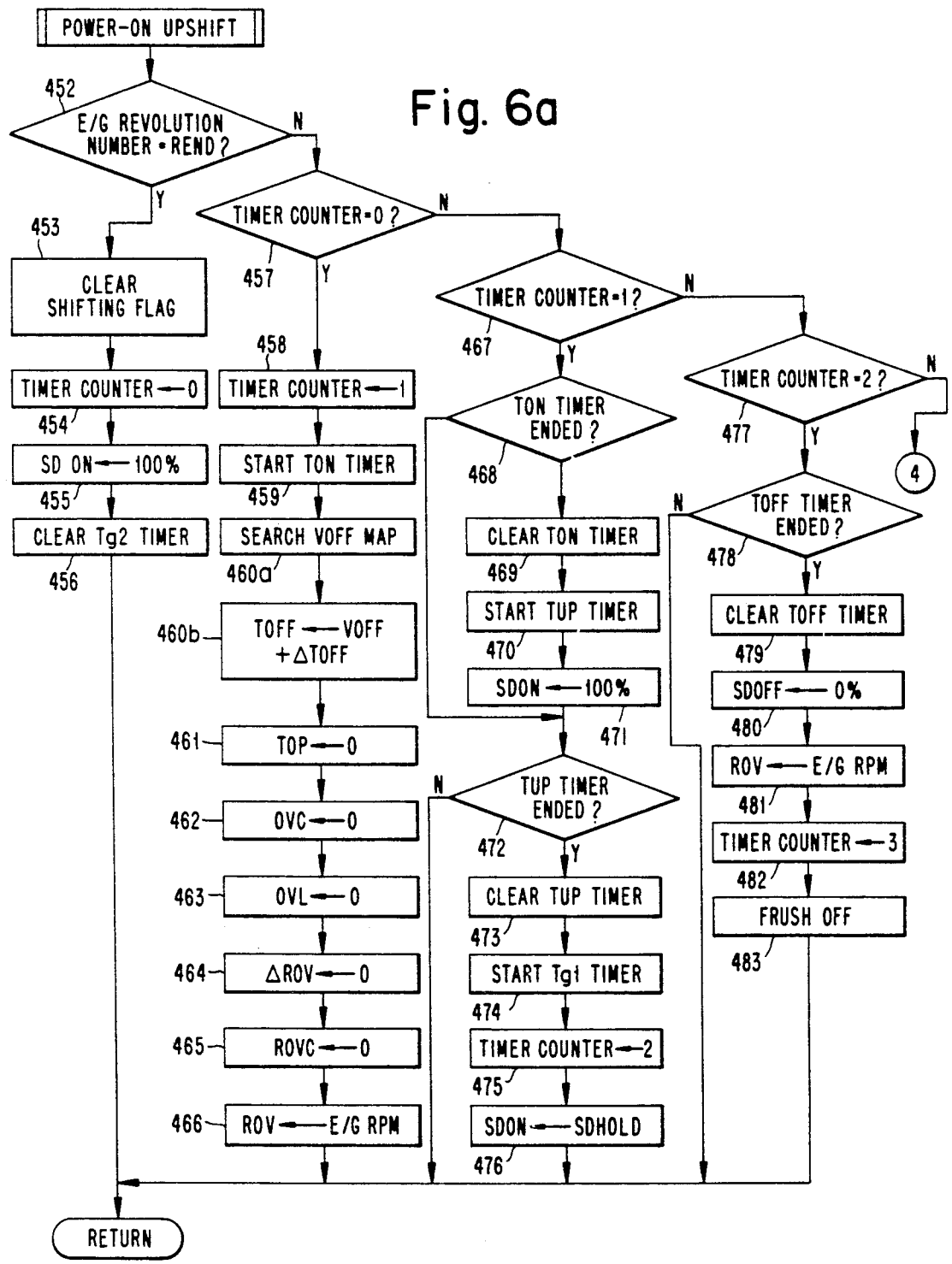
FIGS. 6a, 6b and 6c are a flow chart showing the power-on upshift routine in the output control routine of FIG. 5.
Figure 6B:
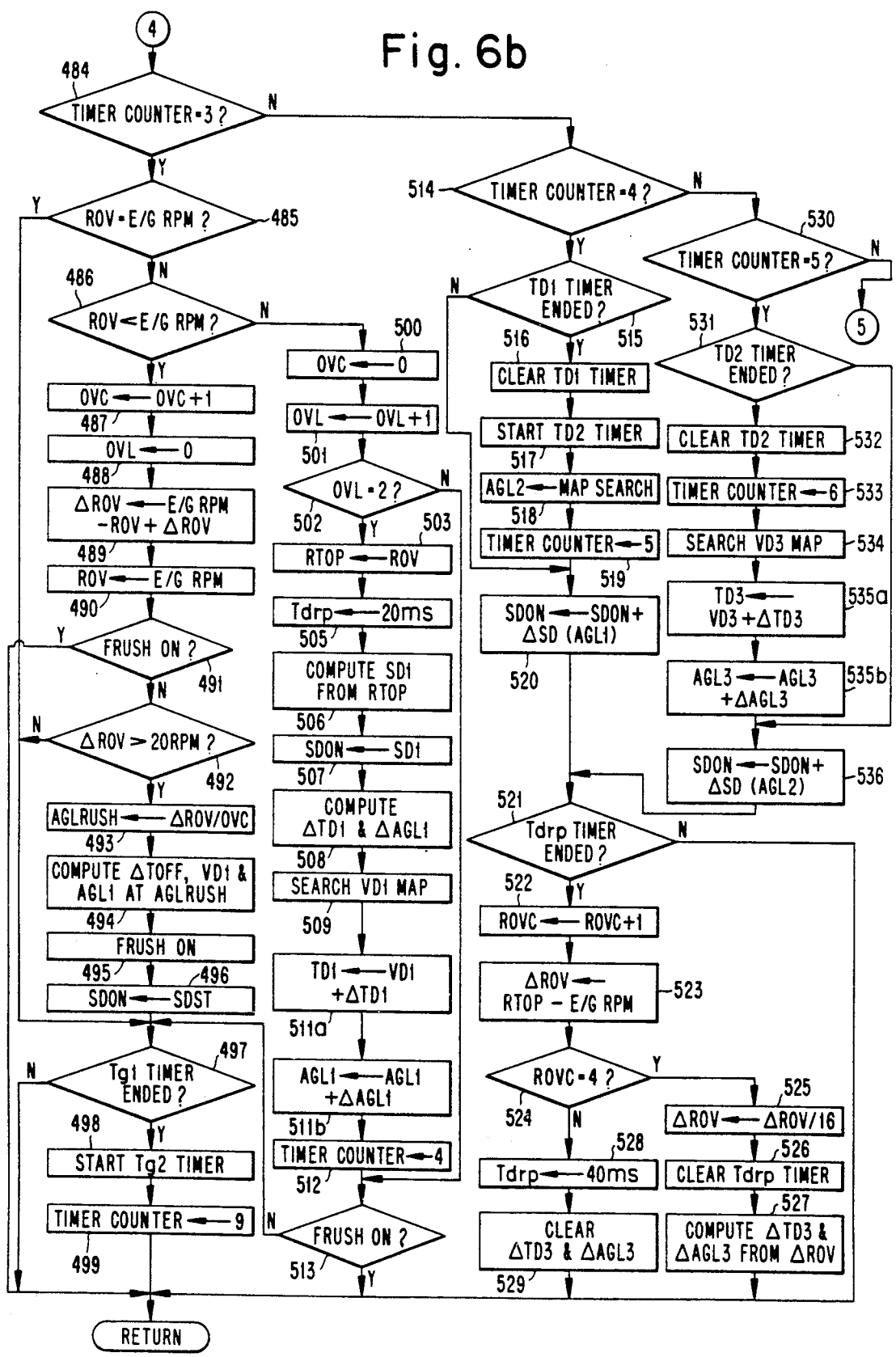
Figure 6C:
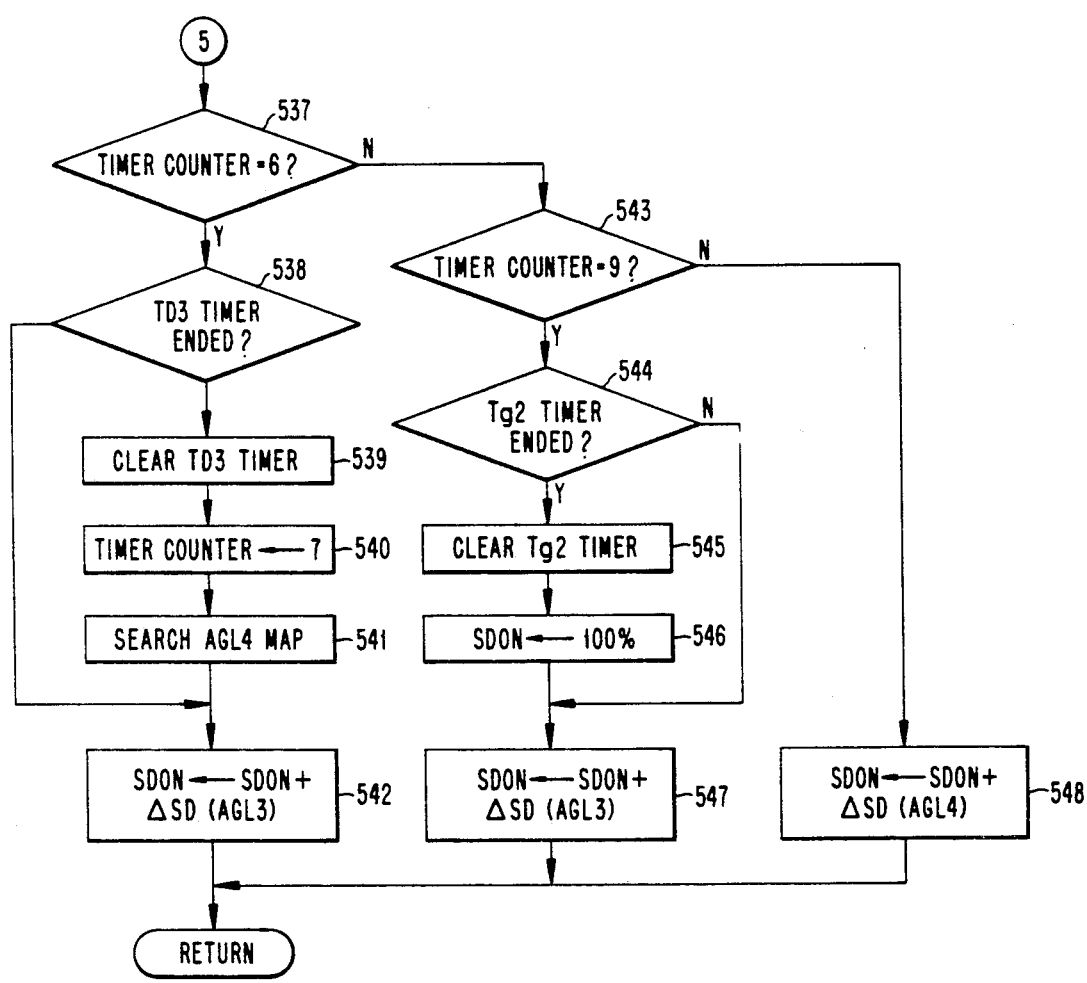

FIGS. 6a, 6b and 6c are flow charts showing the power-on upshift routine.

In this procedure, the timer counter is usually shifted in the order of 1, 2, - - - , 5 and 6 for the individual operations.

In this routine, the engine revolution number NE is monitored at first to decide (at Step 452) whether or not the engine revolution number NE reaches a predetermined value REND. This value REND is the engine revolution number which will be reached after the end of the shift so that it is determined by the multiplication of (the next gear ratio)×(the vehicular speed) when the gear is judged, although not shown. At the start of the shift, therefore, NE≠REND, and the routine advances to Step 457. For NE=REND in the shifting procedure, the shift ending procedures are accomplished at Steps 453 to 456. In these shifting procedures, the timer counter is set at 0 (at Step 454), the routine downstream of Step 458 is always executed at the first time at the start of the shift.

(1) Timer Counter=0:

Since the timer counter is at 0 immediately after the shift judgment, the routine of Steps 458 to 466 is executed. For the next processing, the timer counter is set at 1 (at Step 458), and the TON timer is set and started (at Step 459). The TON timer is set with the time period for which the engagement side solenoid valves are brought into engagement of 100% by the judgment of the shift.

Next, the value of the TOFF is set (at Step 460) to the value which is determined by summing the value VOFF set from the map search according to the shifting condition and the value ΔTOFF set from the engine rotation rising peak value RTOP in the previous shift. The value VOFF is a fundamental time till the release side solenoid valves are released, and the value ΔTOFF is a corrected value. The TOFF timer is subtracted, after set, by the scheduled interruption and is started at this time. After this, controlling memories TOP, OVC, OVL, ΔROV and ROVC are set to 0 (at Steps 461 to 465). Then, the engine revolution number at this time is set in a memory ROV (at Step 466).

After this, the main routine is returned to through the output control routine.

(2) Timer Counter=1:

The timer counter is set to 1 when it is at 0. When the power-on upshift routine is executed, the routine of Steps 468 to 476 is executed (at Step 467).

Here, it is judged (at Step 468) whether or not the TON timer having started from the timer counter=0 is ended. If YES, the TON timer is cleared (at Step 469), the TUP timer is started (at Step 470). Simultaneously with this, a memory SDON is set to 100% (at Step 471). The value of the memory SDON is handled as the duty ratio of the engagement side solenoid valves during the output control, as has been described hereinbefore. By this processing, therefore, the engagement side solenoid valves take the duty ratio of 100% and are in complete engagement. The TUP timer is set with the time period for holding the engagement side solenoid valves in the engagement of 100%.

Next, it is judged (at Step 472) whether or not the TUP timer is ended. If YES, the TUP timer is cleared (at Step 473), and a Tg1 timer is set and started (at Step 474) with the value searched from the map. The timer counter is set (at Step 475) at 2, and a value SDHOLD is substituted (at Step 476) into the memory SDON. The value SDHOLD is a duty ratio corresponding to the lowest oil pressure for starting the operation of the manual valve so that it can improve the responsiveness of a next operation if added.

Thus, the duty ratio of the engagement side solenoid valves is 100% after the end of the YON timer to the end of the TUP timer. After the end of the TUP timer, the engagement side solenoid valves take the duty ratio of the value SDHOLD. The Tg1 timer is set with the limit time for fixing the duty ratio of the engagement side solenoid valves at the value SDHOLD in case there is no rise in the engine revolutions during the gear shift.

(3) Timer Counter 2:

The timer counter is set at 2 at the end of the TUP timer. If the power-on upshift routine is then executed, Steps 478 to 483 are executed (at Step 477).

Here, it is judged (at Step 478) whether or not the TOFF timer having started for the timer counter-0 is ended. If YES, the TOFF timer is cleared (at Step 479), and the memory SDOFF is set at 0% (Step 480). The memory ROV is set (at Step 481) with the engine revolution number at this time. The timer counter is set at 3 (at Step 482). Then, a flag FRUSH is turned off (at Step 483). As a result, the release side solenoid valves hold the duty ratio before the gear ratio judgement during the execution of the TOFF timer and take the value of 0%, i.e., are completely released after the end of the TOFF timer.

(4) Timer Counter=3:

At the end of the TOFF timer, the timer counter 3 is set to 3. If the power-on upshift routine is then executed (at Step 484), the routine at and after Step 485 is executed.

First of all, it is checked (at Step 485) whether or not the engine revolution number is changed with respect to the value ROV. At the start of the timer counter=3, the value ROV takes the engine revolution number at the end of the TOFF timer, namely, at the releases of the release side solenoid valves. Since the input of the engine revolution number is divided into one eighth, in the present embodiment, the engine revolution number NE may not be changed during one round of the main routine. At this time, the most of the routine is skipped through the Step 485. In case the engine revolution number is changed, it is examined (at Step 486) whether or not the engine revolution number at present is increased or decreased with respect to the value ROV. In the increasing direction the value of the memory OVC is incremented by 1 (at Step 487). The memory OVL is set at 0 (at Step 488). The subtraction of the value ROV from the present engine revolution number is added to the value $\Delta$ROV (at Step 489) to update the value ROV to the present engine revolution number (at Step 490). The value $\Delta$ROV is the difference between the engine revolution numbers before the change of the engine rotations and at the present. Moreover, the memory OVC is counted with the updated number of the value $\Delta$ROV.

Next, it is decided (at Step 491) whether or not the flag FRUSH is ON. Since the flag FRUSH is OFF for the timer counter=2, it is decided (at Step 492) whether or not the value $\Delta$ROV is higher than 20 r.p.m. This is continued till the value $\Delta$ROV exceeds 20 r.p.m. so that the flag FRUSH is ON at Step 495. If the value $\Delta$ROV exceeds 20 r.p.m., the ratio of $\Delta$ROV/OVC is substituted into a value AGLRUSH (at Step 493), from which the values $\Delta$TOFF, VD1 and AGL1 are computed (at Step 494). Of these, the values VD1 and AGL1 are values indicating the control time and amount of the engagement side solenoid valves. The value AGLRUSH is determined by dividing the difference between the engine revolutions numbers before the change and at the present time by a value, which corresponds to the updated number of the value $\Delta$ROV, i.e., the difference between the time before the change of the engine rotations and the present time, and is a value corresponding to the acceleration of the engine rotations. When the release side solenoid valves are released, the actual releases of the clutches or brakes are retarded by the delay of the oil pressure circuit. As the releases of the clutches or brakes advance, the neutral state of the automatic transmission is increased so that the engine revolution number is gradually accelerated in case the throttle opening is large. As a result, it is possible to presume the actual state of the clutches or brakes from the amplitude of the value AGLRUSH. This value AGLRUSH is changed with the degree of throttle opening unlike the acceleration of the engine vevolution number. Therefore, the load upon the vehicle can be presumed from the value AGLRUSH. Since the values VD1 and AGL1 to be used for the gear shift are changed according to the value AGLRUSH, the clutches or brakes can be brought into engagements conforming to the running state or the vehicular state.

After this, the flag FRUSH is turned ON (at Step 495), and a value SDST is substituted into the memory SDON (at Steps 495 and 496).

If it is decided at Step 486 that the engine revolution number is in the decreasing direction, the memory OVC is set at 0 (at Step 500), and the value of the memory OVL is incremented by 1 (at Step 501).

If the value of the memory OVL is not at 2 (at Step 502), the routine is then returned to the main routine. If the value of the memory OVL is at 2, namely, if the engine revolution number is continued twice to take the decreasing direction, the preset value ROV is set at the maximum RTOP of the engine revolution number (at Step 503), and a timer TDRP is set and started with 20 ms (at Step 505). Since one computation of the engine revolution takes about 10 ms, a time period of about 20 ms is elapsed from the drop of the engine rotations and before the memory OVL takes the value 2. Then, a value SD1 is computed from the maximum RTOP of the engine revolution number (at Step 506), and the duty of the engagement side solenoid valves is set at the value SD1 (at Step 507). Moreover, the values $\Delta$TD1 and $\Delta$AGL1 are calculated from the maximum RTOP of the engine revolution number (at Step 508). The maximum RTOP of the engine revolution number is changed according to the release state of the release side clutches or brakes. Thus, it is possible to know the release state of the release side clutches or brakes from the value RTOP. The value RTOP is used to compute and correct the duty ratio SD1 at the start of engagements of the engagement side clutches or brakes and the first gradient AGL1 after the engagements so that the gear shift can be accomplished in the optimum state.

Next, the value VD1 is read out (at Step 509) from the map in accordance with the running state. Then, the timer TD1 is set with the summation of the value VD1 and the value $\Delta$TD1 (at Step 511a) to start the timer TD1, and the value AGL1 is corrected (at Step 511b) by adding the value $\Delta$AGL1 thereto. After this, the timer counter is set to 4 (at Step 512).

If, for the timer counter=3, the Tg1 timer is ended (at Step 497) before the engine revolution number has not become higher than that at the released time of the release side solenoid valves by 20 r.p.m., then the Tg2 timer is started (at Step 499), and the timer counter is set to 9 (at Step 499). Usually in the upshift case, the engine is unloaded to have its revolution number increased, if both the release side solenoid valves and the engagement side solenoid valves are released. If, however, the engine revolution number does not rise by 20 r.p.m. or more within a predetermined time period, the exceptional procedures of the timer counter=9 are accomplished.

(5) Timer Counter=4:

If the engine revolution number begins to drop, the timer counter is set to 4. If the power-on up-shift routine is then (at Step 514) executed, the operations at and after Step 515 are executed.

Unless the TD1 timer is ended, the duty ratio of the engagement side solenoid valves is added (at Step 520) for each processing of the timer counter=4 by the value $\Delta$SD (AGL1) based on the value AGL1.

After this, if the TDRP timer is ended (at Step 521), the value of the memory ROVC is incremented by 1 (at Step 522). Then, the difference of the maximum RTOP of the engine revolution number from the engine revolution number at present is stored in the $\Delta$ROV (at Step 523). Unless the memory ROVC have a value 4 (at Step 524), the value of 40 ms is substituted into the TDRP timer to restart it (at Step 528), and the $\Delta$TD3 and $\Delta$AGL3 are cleared (at Step 529). When the value of the memory ROVC is at 4, that is, when the TDRP timer has run four times (i.e., after lapse of 160 ms=about 20 ms from the start of the drop of the engine revolution number to the start of the run of the first TDRP timer+20 ms of the first TDRP timer+3×40 ms), the value $\Delta$ROV is divided by 16 (at Step 525) to update the $\Delta$ROV (indicating the average drop of the engine revolution number for 10 ms). Then, the TDRP timer is cleared (at Step 526), and the values $\Delta$TD3 and $\Delta$AGL3 are computed from the value $\Delta$ROV (at Step 527).

If the TD1 timer is ended (at Step 515) for the timer counter=4, the TD1 is cleared (at Step 516), and the TD2 timer is started (at Step 517) to determine the AGL2 (at Step 518) so that the timer counter is set to 5 (at Step 519).

(6) Timer Counter=5:

When the TD1 timer is ended, the timer counter is set to 5 (at Step 530). If the power-on upshift routines is then executed, the routine at and after Step 531 are executed.

Unless the TD2 timer is not ended (at Step 531), the duty ratio of the engagement side solenoid valves is corrected (at Step 536) for the timer counter=5 by adding thereto a value $\Delta$SD (AGL2) based on the value AGL2. After this, the routine is skipped to Step 521 of the timer counter=4 for similar operations. Specifically, the TDRP timer has run four times (after lapse of 160 ms) after the engine revolution number has begun to drop before the TD2 timer has stopped. Then, the values $\Delta$TD3 and $\Delta$AGL3 are calculated.

When the TD2 timer has stopped (at Step 531), it is cleared (at Step 532), and the timer counter is set to 6 (at Step 533). Next, a value VD3 is searched (at Step 534) from the map in accordance with the running state at that time. A timer TD3 is set and started with the summation of the value VD3 and $\Delta$TD3 (at Step 535). The value $\Delta$TD3 is at 0 for the period of 160 ms after the drop of the engine revolution number and thereafter takes a value determined from the average drop $\Delta$ROV of that period of 160 ms.

(7) Timer Counter=6:

When the TD2 timer has ended, the timer counter is set at 6 (at Step 537). If the power-on upshift routine is then executed, the operations at or after Step 538 are executed.

If the TD3 timer has not ended (at Step 538), the duty ratio of the engagement side solenoid valves is corrected (at Step 542) for the timer counter=6 by adding thereto the valve $\Delta$SD (AGL3) based on the value AGL.

If the TD3 timer has ended (at Step 538), it is cleared (at Step 539), and the timer counter is set to 7 (at Step 540) so that the value AGL4 is computed (at Step 541).

(8) Timer Counter=7:

When the TD3 timer has ended, the timer counter is set at 7. If the power-on upshift routine is then executed, the operation of Step 548 is executed. Here, the duty ratio of the engagement side solenoid valves is corrected (at Step 548) by adding thereto the value $\Delta$SD (AGL4) based upon a value AGL4.

(9) Timer Counter=7:

Unless the engine revolution number rises over 20 r.p.m. within a predetermined time period for the timer counter=3, the exceptional procedures of the timer counter=9 are accomplished. Here, the duty ratio of the engagement side solenoid valves is corrected by adding thereto the value $\Delta$SD (AGL3) based upon the value AGL3 till the Tg2 timer has ended. If the Tg2 timer is ended (at Step 544), it has cleared (at Step 545). Then, the duty of the engagement side solenoid valves is set to 100% (at Step 546) to bring the engagement side solenoid valves into complete engagements.

(10) End of Power-On Upshift:

If, in the course of the procedures thus far described, the engine revolution number takes the value REND to be reached at the end of the gear shift, the controls of the power-on upshift are ended by clearing the shift flag, by setting the timer counter to 0, by setting the duty of the engagement side solenoid valves to 100% and by clearing the Tg2 timer.

Figure 9:
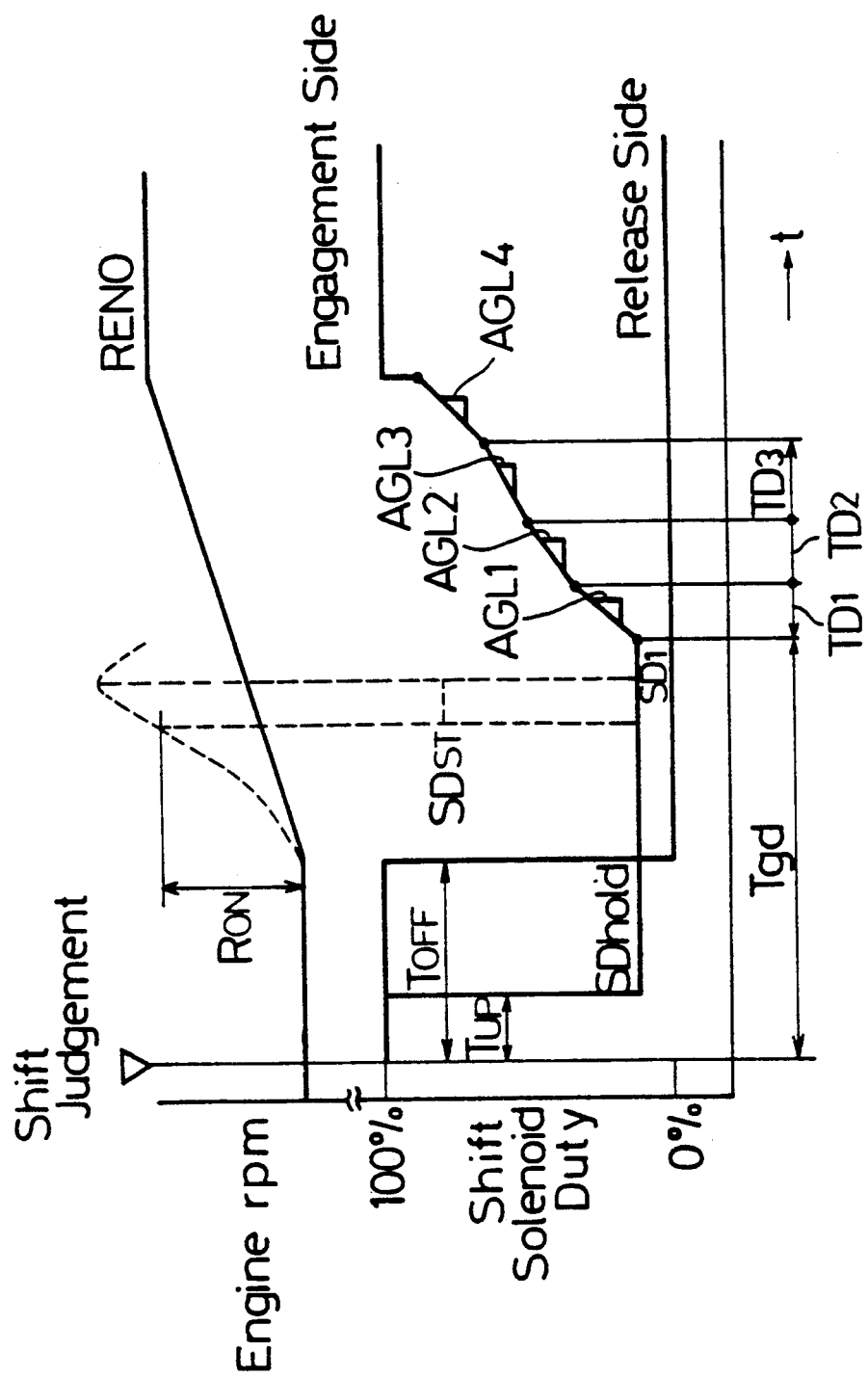
FIGS. 9, 10 and 11 are time charts showing the power-on upshift, power-off upshift and downshift of the embodiment of the present invention.

The flows of the procedures thus far described are illustrated in the form of a time chart in FIG. 9. The duty of the engagement side solenoid valves is changed to 100% the TON sec. from the shift judgement and to the SDHOLD % the TUP sec. thereafter. That duty is changed to the SDST %, when the engine revolution number rises by 20 r.p.m. or more, and to the SD1 % when the engine revolution number reaches its maximum. After this, the duty rises at the gradient AGL1 for the TD1 sec., at the gradient AGL2 for the TD2 sec., at the gradient AGL3 for the TD3 sec., and at the gradient AGL4 to the last. If the engine revolution number reaches the REND in the meanwhile, the control is ended by setting the duty of the engagement side solenoid valves at 100%. The duty of the release side solenoid valves is dropped to 0% the TOFF sec. after the shift judgment.

Power-Off Upshift Routine

Figure 7A:
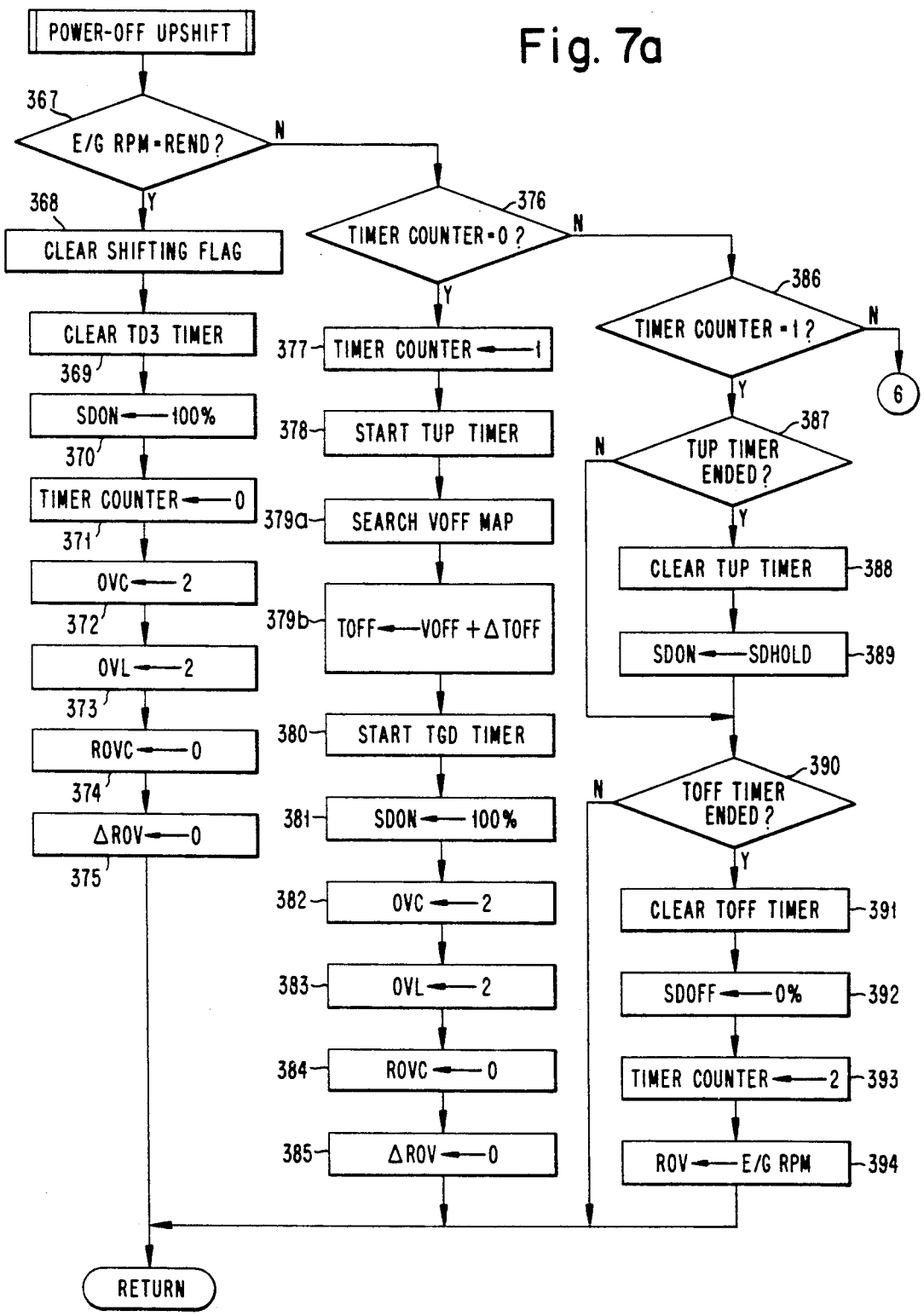
FIGS. 7a, 7b and 7c are a flow chart showing the power-off upshift routine in the output control routine of FIG. 5.
Figure 7B:
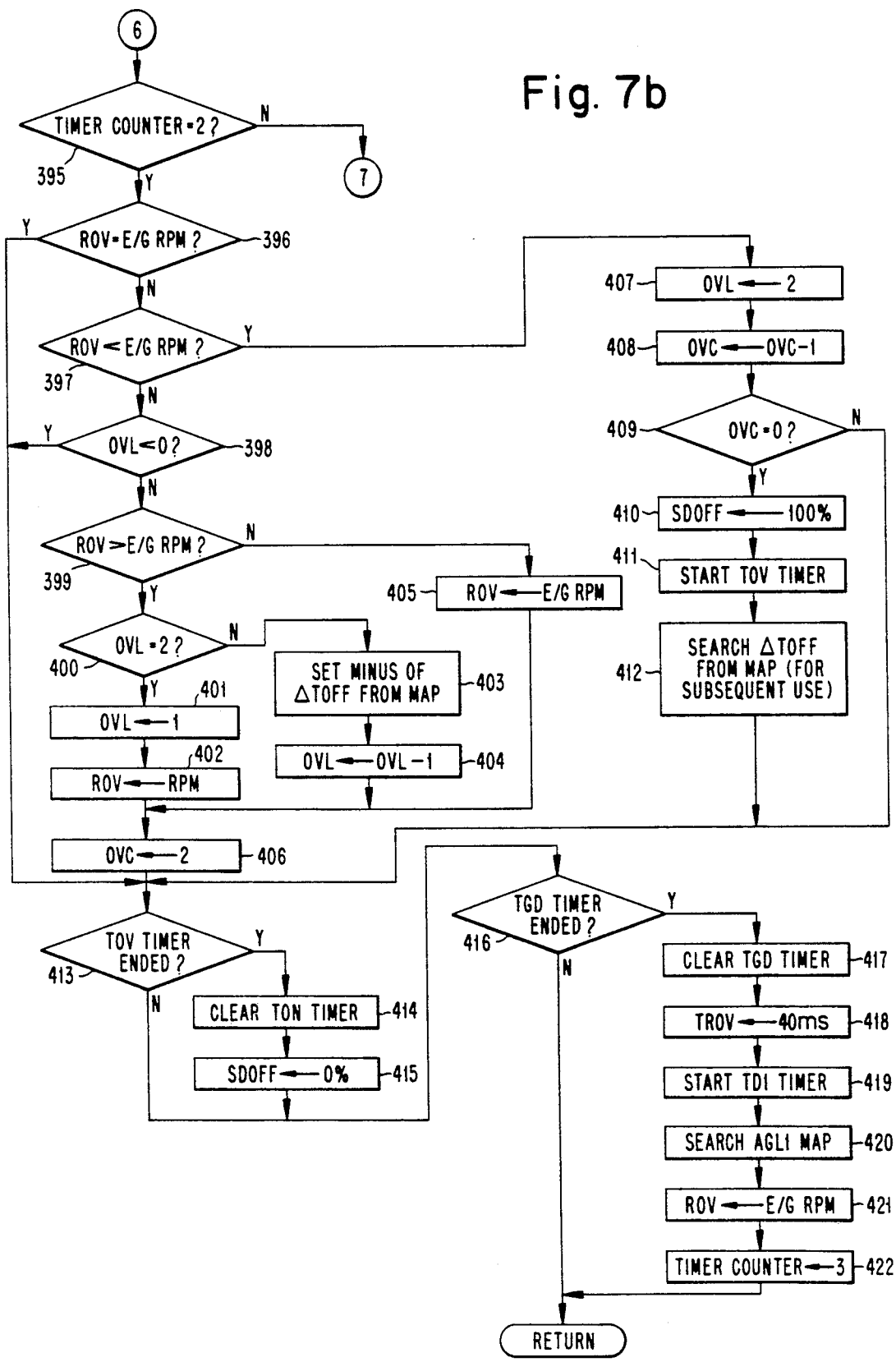
Figure 7C:
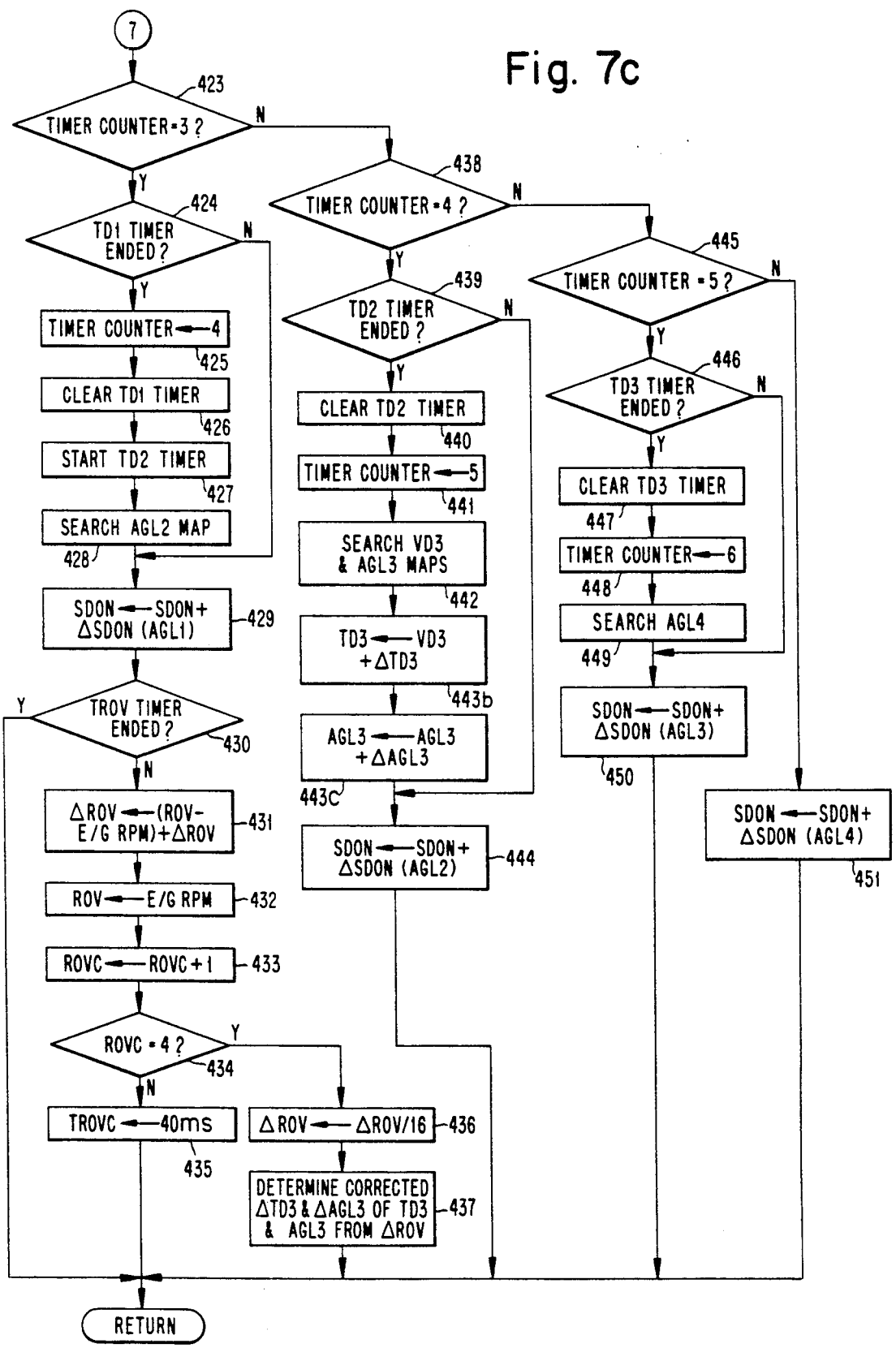

FIGS. 7a, 7b and 7c are flow charts showing the power-off upshift routine. These procedures are accomplished for each value of the timer counter like the power-on upshift routine.

(1) Timer Counter=0:

Since the timer counter is set to 0 at the end of each shift, the timer counter equals 0 at the shift judgment.

Here, the value of the time counter is rewritten to 1 (at Step 377), and the TUP timer is set (at Step 378). Next, the value VOFF is searched (at Step 379a) from the map in accordance with the running state. Then, the timer TOFF is set with the summation of the values VOFF and ΔTOFF to start the timer TOFF (at Step 379b). Then, the Tgd timer is started (at Step 380), and the duty of the engagement side solenoid valves is set to 100% (at Step 381). The memories OVC and OVL are set to 2 (at Steps 382 and 383), and the memories ROVC and ΔROV are set to 0 (at Steps 384 and 385).

(2) Timer Counter=1:

For the timer counter=0, the timer counter is set at 1. Then, the procedures at and after Step 387 are executed (at Step 386).

If it is decided (at Step 387) that the TUP timer is ended, this TUP timer is cleared (at Step 388), and the duty of the engagement side solenoid valves is set to the SDHOLD (at Step 389).

If, on the other hand, it is decided (at Step 390) that the TOFF timer has ended, the TOFF timer is cleared (at Step 391), and the duty of the release side solenoid valves is set to 0% (at Step 392). Then, the timer counter is set to 2 (at Step 393), and the engine revolution number is substituted into the ROV (at Step 394).

(3) Timer Counter=2:

If the TOFF timer has ended, the timer counter equals 2 (at Step 395).

First of all, unless the engine revolution number is updated at the computation, the routine is skipped to Step 413. If the engine revolution number rises, the value 2 is substituted into the OVL (at Step 407), and the value OVC is subtracted by 1 (at Step 408). If the value OVC is set to 0 (at Step 409), the duty ratio of the release side solenoid valves is set to 100% (at Step 410), and the release side is brought again into engagements. Then, the TOV timer has its value read out from the map so that it is started (at Step 411). The value ΔTOFF is read out from the map (at Step 412).

If the engine revolution number is not raised but dropped at not a high rate, it is substituted into the ROV (at Step 405).

If the engine rotations drop at a high rate, it is then decided (at Step 400) whether or not the OVL is at 2. If YES, the OVL is set to 1 (at Step 401), and the engine revolution number is substituted into the ROV. Unless the OVL is at 2, the value ΔTOFF is searched from the map and is inverted and set (at Step 403). The value OVL is subtracted by 1 (at Step 404). At this time, the value OVC is set to 2 (at Step 406). Here, in case the OVL is turned negative by the subtraction at Step 404, the routine is skipped from Step 298 to Step 406.

Next, if it is decided (at Step 413) that the TOV timer has ended, the TOV timer is cleared (at Step 414), and the duty ratio of the release side solenoid valves is set to 0% (at Step 415).

Then, it is decided (at Step 416) whether or not the Tgd timer has ended. If YES, the Tgd timer is cleared (at Step 417, and the TROV timer is set to 40 ms (at Step 418). The TD1 set in accordance with the running state is started (at Step 419). The value AGL1 is read out (at Step 420), and the engine revolution number is substituted into the ROV (at Step 421). Then, the timer counter is set to 3 (at Step 422).

If the engine rotaions are accelerated after the release side solenoid valves are released, the release side solenoid valves are engaged again for only the TOV time, and the TOFF time for the subsequent gear shift is elongated. If the engine rotations are abruptly dropped continuously twice after the release side solenoid valves are released, the TOFF time for the subsequent gear shift is shortened.

(4) Timer Counter=3:

When the Tgd timer has ended, the timer counter is set at 3.

Here, it is decided (at Step 424) whether or not the TD1 timer has ended. If YES, the timer counter is set to 4 (at Step 425), and the TD1 timer is cleared (at Step 426). Then, the TD2 timer set in accordance with the running state is started (at Step 427), and the AGL2 is set (at Step 428). For each processing of the timer counter=3, the value ΔDON (AGL1) based upon the value AGL1 is added (at Step 429) to the duty ratio of the engagement side solenoid valves.

After this, it is decided (at Step 430) whether or not the TROV timer has ended. If YES, the difference of (ROV−the engine revolution number) is added to the value ΔROV (at Step 431). Then, the engine revolution number is substituted into the value ROV (at Step 432), and the value ROV is incremented by 1 (at Step 433). The TROVC timer is set with 40 ms (at Step 435) until the ROVC takes the value 4. If the ROVC is at 4, the value ΔROV/16 is substituted into the ΔROV (at Step 436), and the values ΔTD3 and ΔAGL3 are determined from the ΔROV (at Step 437). Since the value ΔROV is one sixteenth of the drop of the engine revolution number at the end of the Tgd timer 160 ms after the end of the Tgd timer, it is the average dropping value for 10 ms, i.e., the average dropping rate.

(5) Timer Counter=4:

When the TD1 timer has ended, the timer counter is at 4. Here, the duty ratio of the engagement side solenoid valves is increased (at Step 444) at the rate of ΔSDON (AGL2) until the TD2 timer has ended (at Step 439).

If the TD2 timer has ended (at Step 439), the TD2 timer is cleared (at Step 440), and the timer counter is set to 5 (at Step 441). Next, the values VD3 and AGL3 are searched (at Step 442) from the map in accordance with the running state. The timer TD3 is set and started with the summation of VD3 and ΔTD3 (at Step 443b). Moreover, the value AGL3 is corrected by adding thereto the value ΔAGL3.

(6) Timer Counter=5:

When the TD2 timer has ended, the timer counter is at 5 (at Step 445). The procedures are similar to those of the power-on upshift for the timer counter=6, and the duty ratio of the engagement side solenoid valves is increased at the rate of ΔSDON (AGL3) (at Steps 445 to 451) until the TD3 timer has ended.

(7) Timer Counter=6:

When the TD3 timer has ended, the timer counter is at 6. The procedures are similar to those of the power-on upshift for the timer counter=7, and the duty ratio of the engagement solenoid valves is increased at the rate of ΔSDON(AGL3).

(8) End of Power-Off Upshift:

If, in the course of the procedures thus far described, the engine revolution number arrives at the value REND to be reached after the end of the gear shift, the shift flag is cleared (at Step 368), and the TD3 timer is cleared (at Step 369). The duty ratio of the engagement side solenoid valves is set to 100% (at Step 370). Then, the control of the power-off upshift is ended by setting the timer counter to 0 (at Step 371), by substituting the value 2 into the OVC and OVL (at Steps 372 and 373) and by setting the ROVC and ΔROV to 0 (at Steps 374 and 375).

Figure 10:
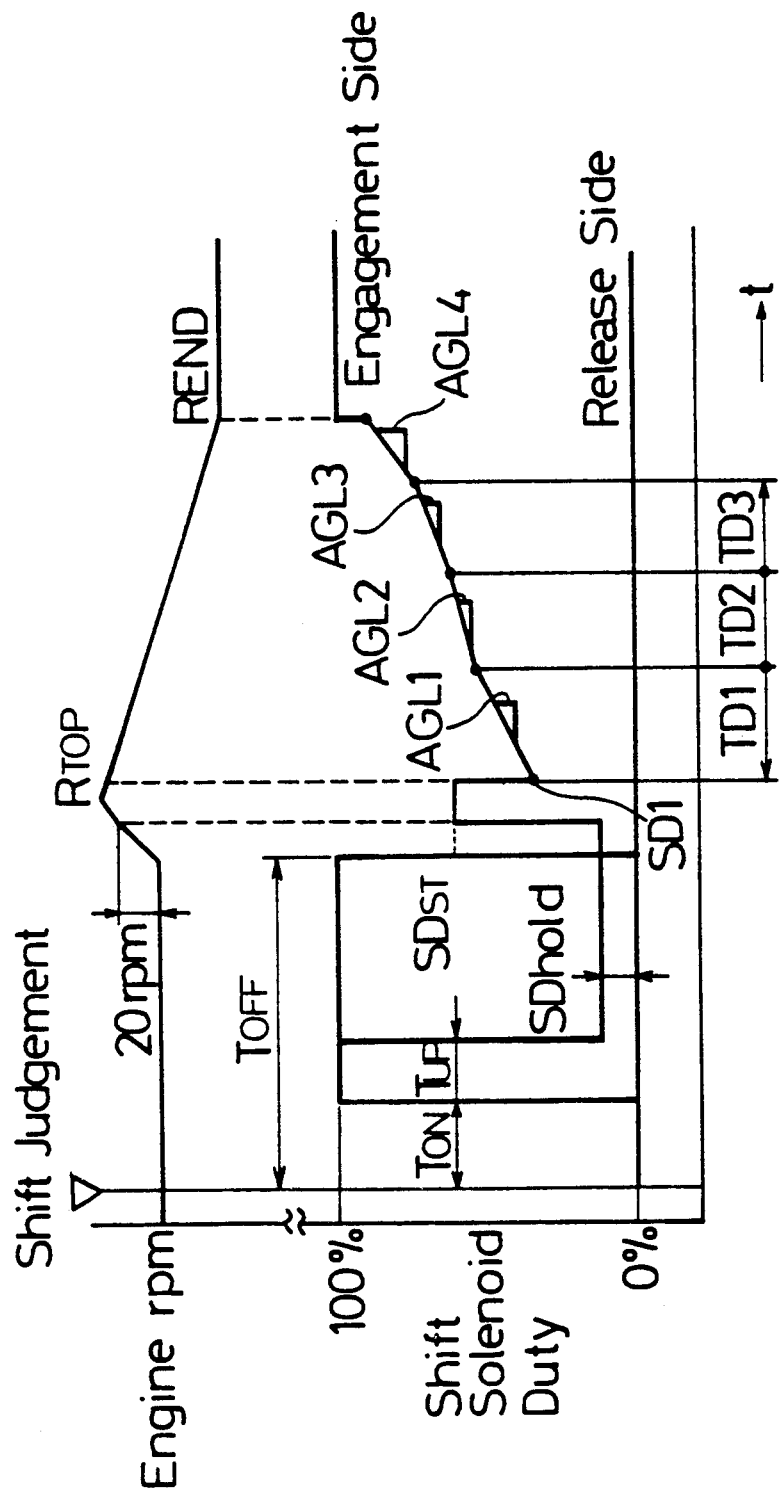

The flow of the procedures thus far described are illustrated in the form of a time chart in FIG. 10. The duty ratio of the release side solenoid valves is set to 0% the TOFF sec. In this case, however, the engine rotations are raised the TOFF sec. after, the duty ratio is set to 100% for the TOV sec. The duty ratio of the engagement side solenoid valves is fixed at 100% until the Tgd sec. later from the shift judgment. After this, the duty ratio rises at the gradient AGL1 for the TD1 sec., at the gradient AGL2 for the subsequent TD2 sec., and at the gradient AGL3 for the subsequent TD3 sec. After this, the duty ratio continuously rises at the gradient AGL4. When the engine revolution number reaches the value REND, the duty ratio is fixed at 100%, and the control is ended.

In the case of the power-off upshift, the throttle opening is low, and the engine revolution number may not rise after the release side clutches or brakes have been released. Therefore, the engagements of the engagement side solenoid valves are accomplished by the timer (Tgd).

Downshift Routine

Figure 8A:
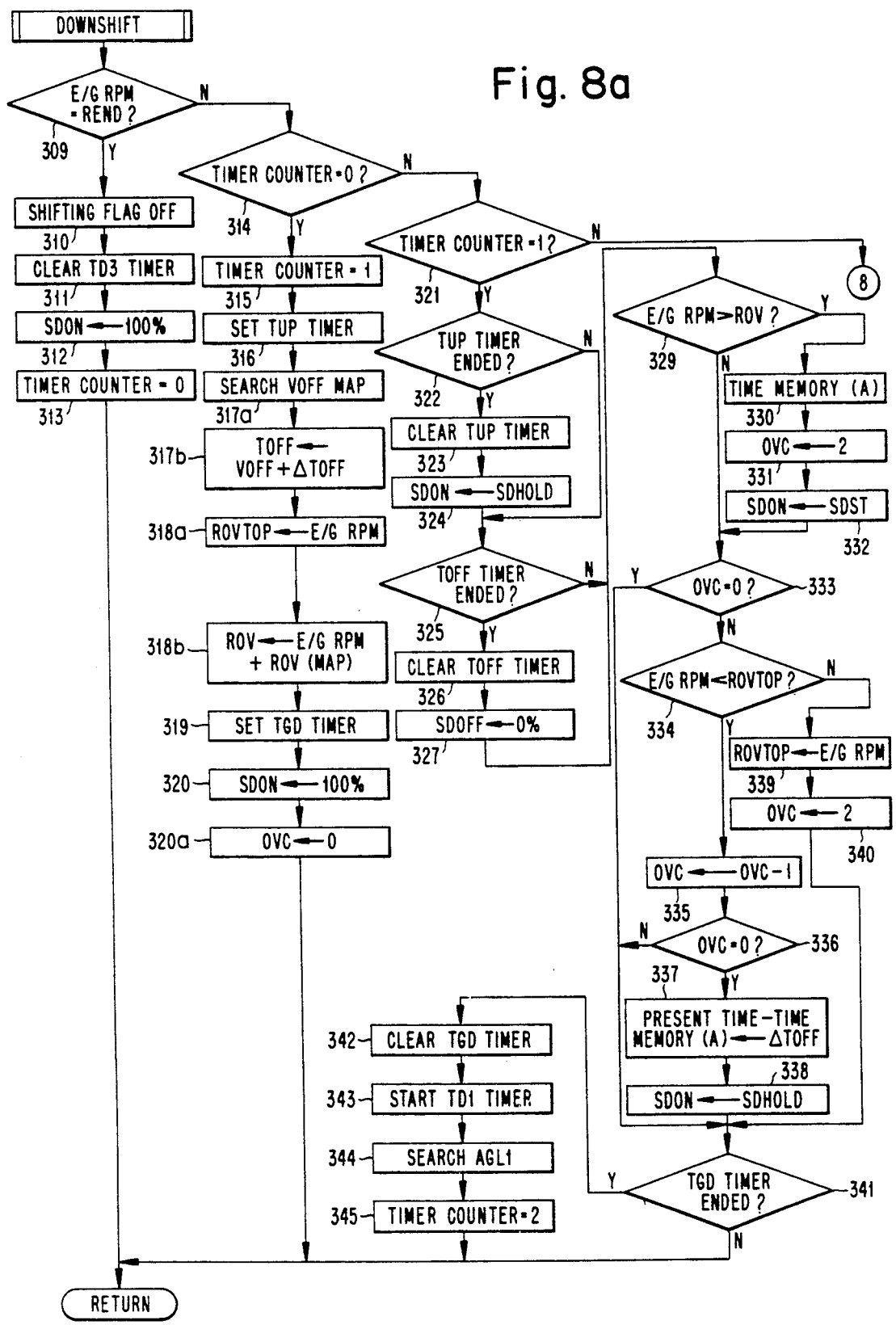
FIGS. 8a and 8b are a flow chart showing the downshift routine in the output control routine of FIG. 5.
Figure 8B:
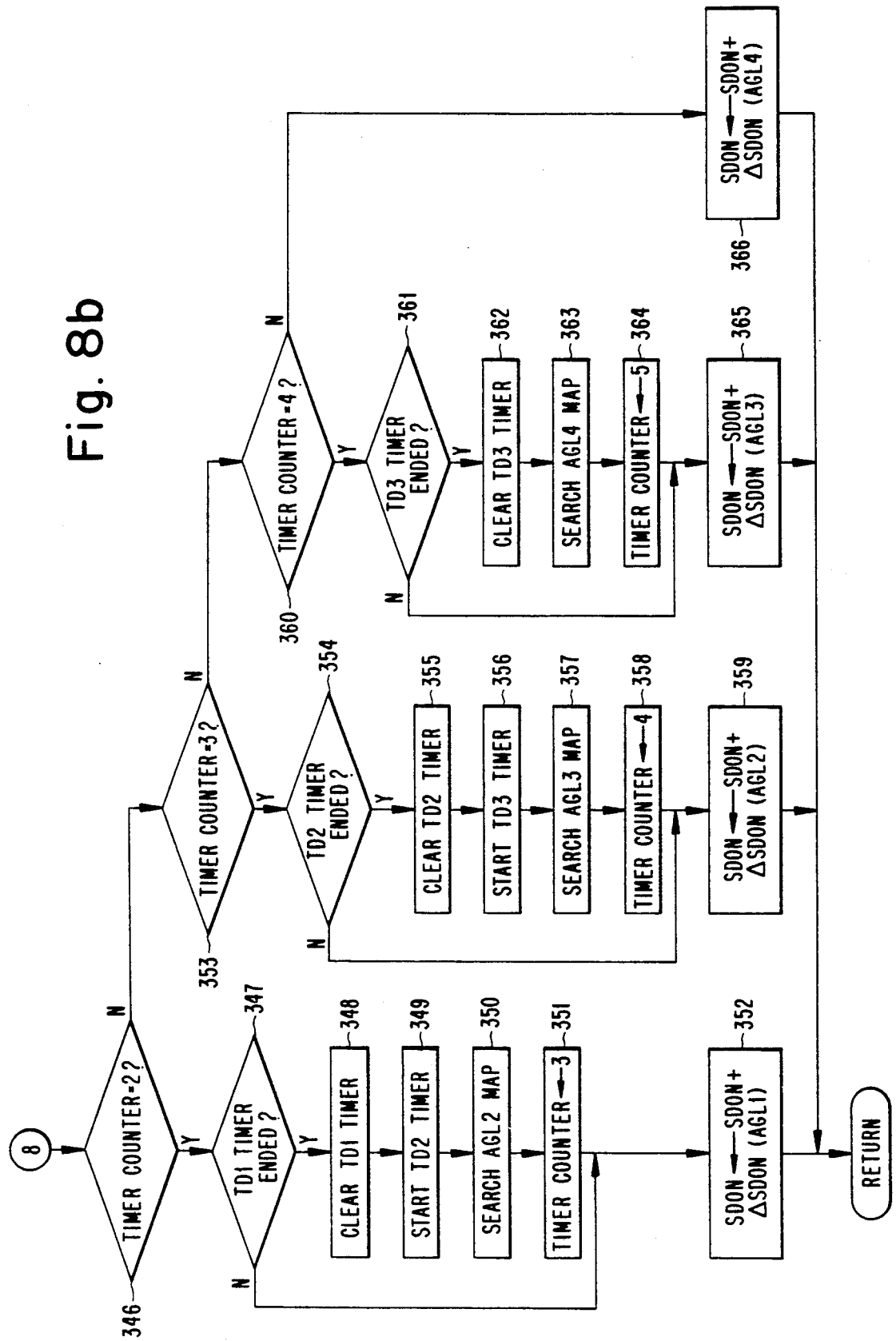

FIGS. 8a and 8b are flow charts showing the downshift routine.

These procedures are accomplished for each value of the timer counter like the power-on upshift routine.

(1) Timer Counter=0:

Since the timer counter is set at 0 for each end of the gear shift, the timer counter=0 at the judgement of the gear shift.

Here, the timer counter has its value rewritten to 1 (at Step 315), and the TUP timer is set (at Step 316). Next, the value VOFF is searched (at Step 317a) from the map in accordance with the running state. Then, the timer TOFF is set and started with the summation of the values VOFF and ΔTOFF (at Step 317b). Next, the engine revolution number is substituted into the ROVTOP (318a), and the ROV is read out from the memory (at Step 318b) and is updated with the summation of the value ROV and the engine revolution number. Moreover, the Tgd timer is started (at Step 319), and the duty ratio of the engagement side solenoid valves is set to 100% (at Step 320). Then, the OVC is set to 0 (at Step 320a).

(2) Timer Counter=1:

For the timer counter=0, the timer counter is set to 1 (at Step 321). Then, the procedures at and after Step 322 are executed.

First of all, it is decided (at Step 322) whether or not the TUP timer has ended. If YES, the TUP timer is cleared (at Step 323), and the duty of the engagement side solenoid valves is set to SDHOLD (at Step 324).

Then, it is decided (at Step 325) whether or not the TOFF timer has ended. If YES, the TOFF timer is cleared (at step 326), and the duty of the release side solenoid valves is set to 0% (at step 327).

Next, it is decided (at step 329) whether or not the engine revolution number is larger than the value ROV. If YES, the present time is stored in the A register (at step 330), and the value 2 is substituted into the OVC (at step 331). Then, the duty ratio of the engagement side solenoid valves is set to the SDST (at step 332). Next, it is decided (at step 333) whether or not the OVC is at 0. If NO, the engine revolution number and the value ROVTOP are compared (at step 334) to decide whether the former is smaller than the latter. If NO, namely, if the engine revolution number is larger than the value ROVTOP, the former is substituted into the latter 1 (at step 339) to set the OVC to 2 (at step 340). If the engine revolution number is smaller than the value ROVTOP, the value OVC is subtracted by 1 (at step 335). If the value OVC is at 0 (at step 336), the value ΔTOFF is set (at step 337) with the difference of the present time from the time stored in the A register, and the duty ratio of the engagement side solenoid valves is set at the value SDHOLD (at Step 338).

If the Tgd timer has ended (at Step 341), it is cleared (at Step 342). Then, the TD1 timer is started (at Step 343), and the AGL1 is searched (at Step 344). After this, the timer counter is set to 2 (at Step 345).

The memory OVC is set at 0 at the start of the gear shift so that it takes the value 2 when the engine revolution number is larger by a predetermined value than that at the start of the gear shift. This value of the memory OVC is still at 2 while the engine rotations are rising. The memory value OVC is subtracted 1 by 1 when the engine revolutions reach the peak and do not rise any more. The memory value OVC is dropped to 0 if the engine rotations do not rise continuously twice. The duty ratio of the engagement side solenoid valves is changed to the value SDST % after the engine revolution number has risen a predetermined value or more than the start of the gear shift before the engine rotations do not rise continuously twice. Moreover, the time period after the engine revolution number has risen a predetermined value or more than the start of the gear shift before the engine rotations do not rise continuously twice is stored at ΔTOFF. Since this time ΔTOFF is added to the time period till the release side solenoid valves are released at the subsequent gear shift, the engine revolution number is reluctant to abruptly rise at the subsequent gear shift.

(3) Timer Counter=2:

When the Tgd timer has ended, the timer counter equals 2 (at Step 346).

Here, it is decided (at Step 347) whether or not the TD1 timer has ended. If YES, the TD1 timer is cleared (at Step 348), and the TD2 timer is started (at Step 349). Then, the AGL2 is set (at Step 350), and the timer counter is set to 3 (at Step 351). For each processing of the timer counter=2, the value ΔSDON (AGL1) based upon the value AGL1 is added (at Step 352) to the duty ratio of the engagement side solenoid valves.

(4) Timer Counter=3:

When the TD1 timer has ended, the timer counter is at 3 (at Step 353). Here, the duty ratio of the engagement side solenoid valves is increased (at Step 359) at the rate of ΔSDON (AGL2) until the TD2 timer has ended.

When it is decided (at Step 354) that the TD2 timer has ended, this timer TD2 is cleard (at Step 355), and the TD3 timer set according to the running state is started (at Step 356). In accordance with the running state, moreover, the value AGL3 is searched from the map (at Step 357), and the timer counter is set to 4 (at Step 358).

(5) Timer Counter=4:

When the TD2 timer has ended, the timer counter is at 4 (at Step 360). These procedures are similar to those of the timer counter=6 of the power-on up-shift, and the duty ratio of the engagement side solenoid valves is increased (at Step 365) ΔSDON (AGL3) until the TD3 timer has ended.

(6) Timer Counter=5:

When the TD3 timer has ended, the timer counter is at 5. These procedures are similar to those of the timer counter=7 of the power-on upshift, and the duty ratio of the engagement side solenoid valves is increased at the rate of ΔSDON (AGL4).

(7) End of Downshift:

If, in the course of the procedures thus far described, the engine revolution number reaches the value REND to be taken at the end of the gear shift, the shift flag is cleared (at Step 310), and the TD3 timer is cleared (at Step 311). Then, the duty ratio of the engagement side solenoid valves is set to 100% (at Step 312). Thus, the control of the downshift is ended by setting the timer counter to 0 (at Step 313).

Figure 11:
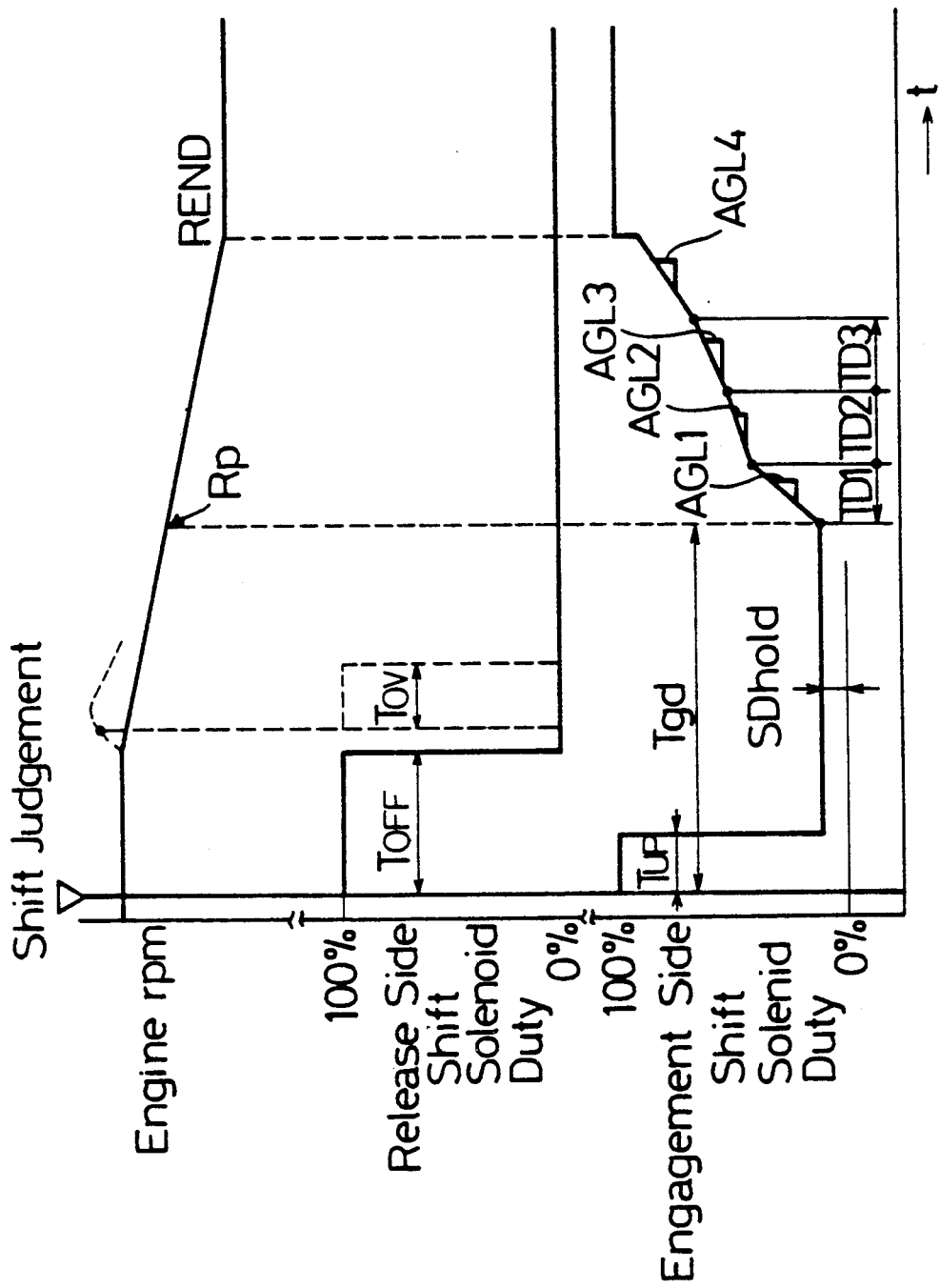

The flow of the downshift thus far described are illustrated in the form of a time chart in FIG. 11. The duty ratio of the release side solenoid valves is set to 0% the TOFF sec. after. The duty ratio of the engagement side solenoid valves is fixed at 100% for the TUP sec. after the shift judgment and at the SDHOLD % the Tgd sec. after the shift judgment. In case, however, the engine revolution number rises to a predetermined value or more, the duty ratio of the engagement side solenoid valves is raised to the SDST % until the engine revolution number reaches its peak value. The duty ratio rises at the gradient AGL1 for the subsequent TD1 sec. and at the gradient AGL2 for the subsequent TD3 sec. After this, the duty ratio continuously rises at the gradient AGL4. When the engine revolution number reaches the value REND, the control is ended by fixing the duty ratio at 100%.

In the embodiment thus far described, the case, in which the engine revolution number is abruptly risen after the release of the release side clutches or brakes in the power-off upshift with the small throttle opening, is detected at Steps 397 and 402 to 409. In these Steps, the duty ratio of the release side solenoid valves is set to 100%, when the engine rotations are raised continuous twice, and is returned to 0% after the TOV timer is ended. Moreover, the value ΔTOFF is searched from the map so that it may be used for the subsequent gear shift. Even if, therefore, the engine rotations are raised, this rise is suppressed because the release side clutches or brakes are engaged again. In the present embodiment, the time period after the releases of the release side clutches or brakes before the engagements of the engagement side clutches or brakes is shortened by engaging the release side clutches or brakes again. However, the engagements of the engagement side clutches or brakes.

Moreover, the duty ratio is set at 100% when in the re-engagements of the release side clutches or brakes but may be changed to a suitable value according to the state of the engine or the system.

The throttle opening is used to determine the drive force of the engine. This throttle opening may be replaced by another means for determining the engine drive force, such as the torsional torque of the shaft of rotation, the degree of depression of the accelerator or the vacuum in the intake manifold.

As has been described hereinbefore, according to the present invention, there is provided an electronically controlled automatic transmission system comprising: an automatic transmission including clutches and brakes adapted to be actuated by applying a fluid pressure, for changing gear ratios in accordance with the engagements and releases of the clutches and the brakes; fluid pressure switching means (the oil pressure circuit) for controlling the application of the fluid pressure to the clutches and the brakes; drive power detecting means (26) for detecting the drive force of an engine; and electronic control means (the CPU) for driving the fluid pressure switching means in accordance with the detected value of the drive force detecting means to change the engagements and releases of the clutches and the brakes, wherein the improvement comprises: revolution number measuring means (23 or 24) for measuring the number of revolutions of the input shaft of the automatic transmission after the clutches or the brakes at the release side are released for the gear shift; and acceleration detecting means (Steps 397, 406, 408 and 409) for detecting the acceleration of the number of revolutions detected by the revolution number measuring means, and wherein the electronic control means causes the clutches or the brakes at the release side to engage (at Step 410) at a predetermined ratio, if the acceleration detected by the acceleration detecting means after the release of the clutches or the brakes at the release side and before the engagement of the clutches or the brakes at the engagement side is high when the detected value of the drive force detecting means is small (power-off).

Moreover, the electronic control means elongates (Steps 379b and 412) the time period from the decision of a next gear shift to the instruction of releasing the clutches or the brakes at the release side, if the acceleration detected by the acceleration detecting means after the release of the clutches or the brakes at the release side and before the engagement of the clutches or the brakes at the engagement side is high when the detected value of the drive force detecting means is small.

Still moreover, the electronic control means shortens the time period from the release of the clutches or the brakes at the release side to the engagements of the clutches or the brakes at the engagement side, if the acceleration detected by the acceleration detecting means after the release of the clutches or the brakes at the release side and before the engagement of the clutches or the brakes at the engagement side is high when the detected value of the drive force detecting means is small.

As a result, despite the fact that the output value of the drive force detecting means is low, the time period of raising the number of revolutions of the engine can be shortened to lighten the shocks during the gear shift, even if the engine has such a high drive force that its number of revolutions is raised when the clutches or brakes at the release side are released.

In accordance with another major aspect of the present invention, if the neutral state takes place after the releases of the release side clutches or brakes, the engagement side clutches or brakes are fixed at the predetermined ratio STSD % before the scheduled start of the engagements of the engagement side clutches or brakes only in the power-on upshift and downshift in which the engine rotations may abruptly rise. As a result, the engagements of the engagement side clutches or brakes will suppress that abrupt rise in the engine revolution number, which might otherwise occur for the gear shift after the releases of the release side clutches or brakes and before the start of engagements of the engagement side clutches or brakes. This prevents the phenomenon that the engine rotations at the start of engagements of the engagement side clutches or brakes rise higher than those at the start of the gear shift to cause the shocks during the engagements.

Incidentally, this aspect of the present invention can also be practiced in the power-off upshift with a view to ensuring the safety.

In this aspect, the engagement side clutches or brakes are set to the predetermined ratio SDST % in accordance with the rise in the engine rotations. This value SDST may be so set that the rise in the engine rotations may be suppressed when the automatic transmission is actually run while preventing the shocks which might otherwise be caused by the deep engagements. In the aspect, the setting of the engagement side clutches or brakes at the predetermined ratio SDST % may be effected by switching the engagement ratio of the engagement side clutches or brakes between 0% and 100% in a high frequency to control the duty ratio.

In the present invention, the measurement of the number of revolutions of the input shaft of the automatic transmission is effected in terms of the engine revolution number, which may be replaced by the turbine revolution number for similar effects.

As has been described hereinbefore, according to second major aspect of the present invention, there is provided an electronically controlled automatic transmission system comprising: an automatic transmission including clutches and brakes adapted to be actuated by applying a fluid pressure, for changing near ratios in accordance with the engagements and releases of the clutches and the brakes; fluid pressure switching means (the oil pressure circuit) for controlling the application of the fluid pressure to the clutches and the brakes; and electronic control means (the CPU) for driving the fluid pressure switching means in accordance with the running state of a vehicle to change the engagements and releases of the clutches and the brakes, wherein the improvement comprises: revolution number measuring means (23 or 24) for measuring the number of revolutions of the input shaft of the automatic transmission after the clutches or the brakes at the release side are released for the gear shift; acceleration detecting means (Steps 489, 490 and 492) for detecting the acceleration of the number of revolutions detected by the revolution number measuring means; and peak value detecting means (Steps 500 to 502) for monitoring the transition of the number of revolutions detected by the revolution number measuring means from the rise to the drop, and wherein the electronic control means instructs the fluid pressure switching means to engage (Step 496) the clutches or the brakes at the engagement side at a predetermined ratio in accordance with the detected value of the acceleration detecting means, after the release (Step 480) of the clutches or the brakes at the release side and to engage (Step 496) the clutches or the brakes at the engagement side at the ratio of the engagement start, when the peak value detecting means detects the transition of the number of revolutions of the input shaft of the automatic transmission from the rise to the drop, and then to increase (Steps 520, 536, 542 and 547) the engagement ratio gradually.

This ensures the smooth engagements in the automatic transmission between the clutches or brakes at the engagement side because there occurs no abrupt increase in the engine revolution number after the releases of the clutches or brakes at the release side before the start of the engagements of the clutches or brakes at the engagement side. Thus, less shocks occur during the engagements so that the driver can feel better at the gear shift.

What is claimed is:

1. An electronically controlled automatic transmission system comprising:
   a plurality of clutches and brakes actuated by applying a fluid pressure thereto;
   fluid pressure switching means for controlling application of the fluid pressure to said clutches and said brakes;
   drive power detecting means for detecting a drive force of an engine;
   electronic control means for driving said fluid pressure switching means in accordance with the detected drive force to adjust the pressure applied to said clutches and said brakes;
   revolution number measuring means for measuring a number of revolutions of an input shaft of said automatic transmission after said clutches and said brakes at a release side of said transmission are released during a current gear shift operation; and
   calculating means for calculating a rate of change of the number of revolutions detected by said revolution number measuring means, wherein said electronic control means commands said fluid pressure switching means to reengage said clutches and said brakes at the release side during the gear shift operation if the rate of change calculated by said calculating means, after the release of said clutches and said brakes at the release side and before an engagement of said clutches and said brakes at an engagement side of the transmission, is higher than a first threshold when the detected drive force is less than a second threshold.

2. An electronically controlled automatic transmission system according to claim 1, wherein said fluid pressure switching means further comprises:
   a plurality of controller means each operable within a range of duty ratios and connected to a different one of a plurality of fluid pressure control devices.

3. An electronically controlled automatic transmission system according to claim 2, wherein:
   said electronic control means commands said fluid pressure switching means to reengage said clutches and brakes at a predetermined duty ratio.

4. An electronically controlled automatic transmission system according to claim 1, wherein:
   said electronic control means commands said fluid pressure switching means to reengage said clutches and brakes for a predetermined time period.

5. An electronically controlled automatic transmission system according to claim 2, wherein:

said plurality of controller means comprise electric solenoid valves and said plurality of fluid pressure control devices comprise manual valves.

6. An electronically controlled automatic transmission system according to claim 1, wherein:

said electronic control means also increases a time period between a decision to begin a next gear shift operation and an instruction for releasing said clutches and said brakes at the release side, after reengaging said clutches and said brakes.

7. An electronically controlled automatic transmission system comprising:

a plurality of clutches and brakes actuated by applying a fluid pressure thereto;

fluid pressure switching means for controlling application of the fluid pressure to said clutches and said brakes;

drive power detecting means for detecting a drive force of an engine;

electronic control means for driving said fluid pressure switching means in accordance with the detected drive force to adjust the pressure applied to said clutches and said brakes;

revolution number measuring means for measuring a number of revolutions of an input shaft of said automatic transmission after said clutches and said brakes at a release side of said transmission are released during a current gear shift operation; and calculating means for calculating a rate of change of the number of revolutions detected by said revolution number measuring means, wherein said electronic control means reduces a first time period between the release of said clutches and said brakes at the release side and an engagement of said clutches and said brakes at an engagement side during the current gear shift operation if the rate of change calculated by said calculating means, after the release of said clutches and said brakes at the release side and before an engagement of said clutches and said brakes at an engagement side of the transmission, is higher than a first threshold when the detected drive force is less than a second threshold.

8. An electronically controlled automatic transmission system according to claim 7, wherein said fluid pressure switching means further comprises:

a plurality of controller means each operable within a range of duty ratios and connected to a different one of a plurality of fluid pressure control devices.

9. An electronically controlled automatic transmission system according to claim 8, wherein:

said plurality of controller means comprise electric solenoid valves and said plurality of fluid pressure control devices comprise manual valves.

10. An electronically controlled automatic transmission system according to claim 7, wherein:

said electronic control means also increases a second time period between a decision to begin a next gear shift operation and an instruction for releasing said clutches and said brakes at the release side, after reducing said first time period.

11. An electronically controlled automatic transmission system comprising:

a plurality of clutches and brakes actuated by applying a fluid pressure thereto;

fluid pressure switching means for controlling application of the fluid pressure to said clutches and said brakes;

drive power detecting means for detecting a drive force of an engine;

electronic control means for driving said fluid pressure switching means in accordance with the detected drive force to adjust the pressure applied to said clutches and said brakes;

revolution number measuring means for measuring a number of revolutions of an input shaft of said automatic transmission after said clutches and said brakes at a release side of said transmission are released during a current gear shift operation;

calculating means for calculating a rate of change of the number of revolutions detected by said revolution number measuring means;

peak value detecting means for detecting a transition of the number of revolutions detected by said revolution number measuring means from an increase to a decrease and wherein said electronic control means instructs said fluid pressure switching means to engage said clutches and said brakes at an engagement side at a predetermined duty ratio in accordance with the calculated rate of change after the release of said clutches and said brakes at the release side, and to engage said clutches and said brakes at the engagement side at an engagement start duty ratio when said peak value detecting means detects said transition and then to increase the duty ratio gradually.

12. An electronically controlled automatic transmission system according to claim 11, wherein said fluid pressure switching means further comprises:

a plurality of controller means each operable within a range of duty ratios and connected to a different one of a plurality of fluid pressure control devices.

13. An electronically controlled automatic transmission system according to claim 12, wherein:

said plurality of controller means comprise electric solenoid valves and said plurality of fluid pressure control devices comprise manual valves.

* * * * *